United States Patent
Farchy et al.

(10) Patent No.: US 10,885,715 B2
(45) Date of Patent: Jan. 5, 2021

(54) INTERACTIVE CARRY

(71) Applicant: MICROSOFT TECHNOLOGY LICENSING, LLC, Redmond, WA (US)

(72) Inventors: Alon Farchy, Redmond, WA (US); Jenny Kam, Seattle, WA (US); Dong Back Kim, Bellevue, WA (US); Alton Kwok, Seattle, WA (US); James Leslie Humphrey, III, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/298,655

(22) Filed: Mar. 11, 2019

(65) Prior Publication Data
US 2020/0226835 A1    Jul. 16, 2020

Related U.S. Application Data

(60) Provisional application No. 62/792,129, filed on Jan. 14, 2019.

(51) Int. Cl.
*G06T 19/00* (2011.01)
*H04L 29/08* (2006.01)
(Continued)

(52) U.S. Cl.
CPC ......... *G06T 19/006* (2013.01); *G03H 1/0005* (2013.01); *G06F 3/017* (2013.01); *H04L 67/04* (2013.01)

(58) Field of Classification Search
CPC combination set(s) only.
See application file for complete search history.

(56) References Cited

U.S. PATENT DOCUMENTS 6,031,519 A *  2/2000  O'Brien ............... G03H 1/0005
                                                   345/156
8,655,004 B2   2/2014  Prest et al.
(Continued)

OTHER PUBLICATIONS

"How do I use Dash on my Oculus Rift?", Retrieved from: https://support.oculus.com/912606748914954/, Retrieved Date: Dec. 26, 2018, 2 Pages.
(Continued)

*Primary Examiner* — Motilewa Good Johnson
(74) *Attorney, Agent, or Firm* — Workman Nydegger

(57) ABSTRACT

Systems and methods are provided for selectively controlling a carry mode for holograms presented in mixed-reality environments and for providing leashing buffers for the holograms. The carry mode enables holograms to be functionally moved within a single mixed-reality environment, and out into one or more different mixed-reality environments. The carry mode can be automatically applied to holograms created within the mixed-reality environment. The carry mode can also be applied responsive to user input applied to world-locked holograms, which triggers a switch from the world-locked mode to the carry mode from. Holograms can also be leashed for persistently displaying holograms associated with or linked to a user in the mixed-reality environment to provide the user increased accessibility to the hologram while navigating within and without a particular mixed-reality environment. Selectable options are presented with a hologram in carry mode for switching from the carry mode to the world-locked mode.

21 Claims, 18 Drawing Sheets

(51) Int. Cl.
*G03H 1/00* (2006.01)
*G06F 3/01* (2006.01)

(56) References Cited

U.S. PATENT DOCUMENTS

| | | | | |
|---|---|---|---|---|
| 9,230,368 B2* | 1/2016 | Keane | .................. | G06F 3/04815 |
| 9,275,608 B2* | 3/2016 | Ueno | ....................... | G09G 5/08 |
| 9,299,183 B2* | 3/2016 | Vesely | .................... | G06F 3/012 |
| 9,361,732 B2* | 6/2016 | Ebstyne | ................ | G06T 19/006 |
| 9,367,136 B2* | 6/2016 | Latta | ........................ | G06F 3/017 |
| 9,429,912 B2* | 8/2016 | Fleck | ................... | G03H 1/2249 |
| 9,643,314 B2 | 5/2017 | Guerin et al. | | |
| 2011/0191707 A1* | 8/2011 | Lee | ..................... | G06F 3/04883 |
| | | | | 715/765 |
| 2012/0081393 A1* | 4/2012 | Kim | ........................ | G06F 3/011 |
| | | | | 345/633 |
| 2013/0201215 A1 | 8/2013 | Martellaro et al. | | |
| 2014/0075370 A1 | 3/2014 | Guerin et al. | | |
| 2014/0306993 A1* | 10/2014 | Poulos | .................. | G06T 19/006 |
| | | | | 345/633 |
| 2015/0317831 A1 | 11/2015 | Ebstyne et al. | | |
| 2017/0060514 A1* | 3/2017 | Kaufthal | ................. | G06F 3/048 |
| 2018/0374143 A1* | 12/2018 | Williamson | ....... | G06Q 30/0643 |
| 2019/0324549 A1* | 10/2019 | Araki | ...................... | G06F 3/017 |

OTHER PUBLICATIONS

"Introducing Rift Core 2.0—Our Biggest Software Update Yet", Retrieved from:https://www.oculus.com/blog/introducing-rift-core/?locale=en_US, Oct. 11, 2017, 3 Pages.

Carbotte, Kevin, "Virtual Reality Gets More Productive as 'Space' Brings Multitasking to the VR Age", Retrieved from: https://www.tomshardware.com/news/space-vr-multitasking-unlimited-displays,32157.html, Jun. 28, 2016, 5 Pages.

Zeller, et al., "Navigating the Windows Mixed Reality home", Retrieved From https://docs.microsoft.com/en-us/windows/mixed-reality/navigating-the-windows-mixed-reality-home, Mar. 21, 2018, 7 Pages.

"International Search Report and Written Opinion Issued in PCT Application No. PCT/US19/068218", dated Mar. 26, 2020, 12 Pages.

* cited by examiner

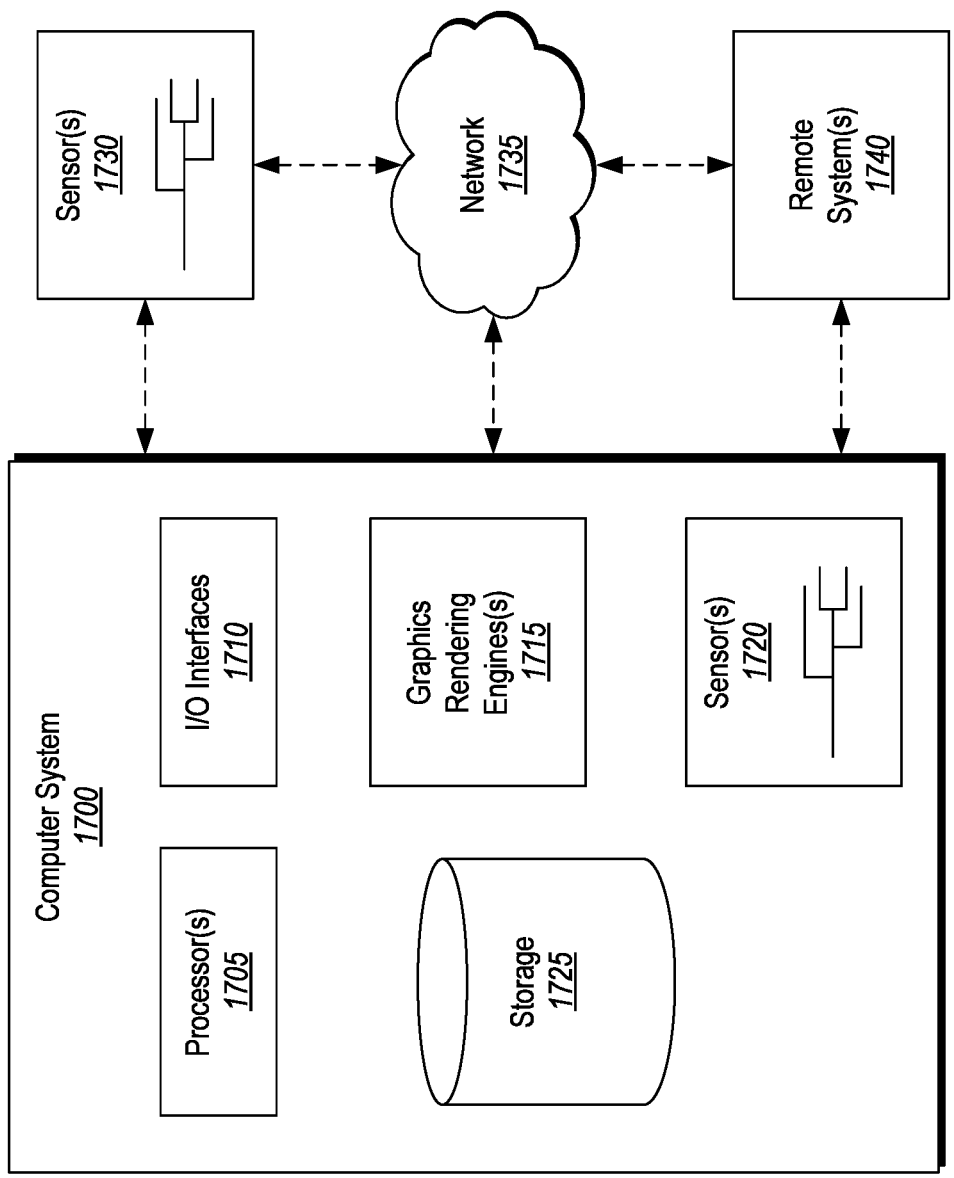
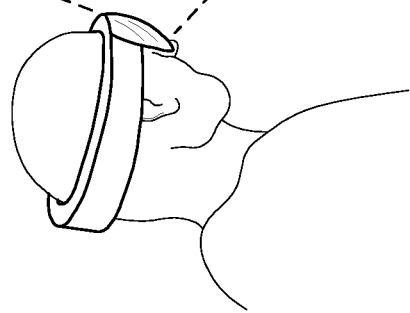
*Figure 17*

INTERACTIVE CARRY

CROSS-REFERENCE TO RELATED APPLICATIONS

This application claims the benefit of and priority to U.S. Provisional Patent Application Ser. No. 62/792,129, filed on Jan. 14, 2019 and entitled "INTERACTIVE CARRY," which application is expressly incorporated herein by reference in its entirety.

BACKGROUND

"Augmented reality" typically refers to virtual experiences where virtual objects are visually placed within the real world, such that a user experiences virtual content and the real world simultaneously. In contrast, "virtual reality" typically refers to immersive virtual experiences where a user's view of the real-world is completely obscured and only virtual objects are perceived. Typically, "mixed-reality" refers to either augmented reality or virtual reality environments. However, for the sake of clarity and simplicity, the terms mixed-reality, virtual reality, and augmented reality are used interchangeably herein.

Mixed-reality systems are typically configured as head mounted displays that generate and/or render the mixed-reality content. Continued advances in hardware capabilities and rendering technologies have greatly increased the realism of virtual objects and scenes displayed to a user within mixed-reality environments. For example, virtual objects, rendered as holograms, can be placed within a mixed-reality environment in such a way as to give the impression that the virtual object is part of the real world. Some of the holograms are interactive and are associated with functions and behaviors that can cause the hologram to react and/or perform a function in response to certain types of user inputs received by a user immersed within the mixed-reality environment that is rendering the hologram(s) being interacted with.

In some instances, a mixed-reality environment may also include interfaces for enabling a user to access and interact with specialized applications, such as a shell application and which is executable outside of the mixed-reality environment and non-native to the mixed-reality environment, without requiring the user to leave the mixed-reality environment. For instance, a user may be able to launch a Movie Player application (e.g., Netflix) within the mixed-reality environment, such as from a shell menu that is accessible as a hologram within the mixed-reality environment. The application may be presented within the mixed-reality environment as a hologram display screen which can render media provided by the application.

The hologram interface may also provide interactive menus for enabling the user to interact with and provide input/selections through virtual touch. Similarly, a system may enable a user to launch a word processing application (e.g., Word) within the mixed-reality environment, with a hologram display and a hologram keyboard that the user can interact with within the mixed-reality environment to enter input into the word processing application and all while being immersed within the mixed-reality environment.

The mixed-reality system coordinates the interaction between the different applications (e.g., mixed-reality application rendering the environment and the shell application(s) virtualized and accessible through the environment). When application file attributes are changed in the virtual environment (e.g., a document is created or modified), those changes can be saved by the application outside of the virtual environment to be persisted by the system after the application is closed in the virtual environment and to be accessible/realized the next time the application is instantiated in the same virtual environment or a different environment (including the real world).

Many applications/holograms launched in a mixed-reality environment, such as non-native applications/holograms, are world-locked relative to the launched/instantiated position of the application/hologram within the mixed-reality environment. This can make it difficult for the user who is immersed in the mixed-reality environment to readily access the applications' hologram interfaces when the user changes their relative position, field of view, or even gaze within the mixed-reality environment.

For instance, a user may not remember exactly where the hologram application interfaces are within the six degrees of viewing freedom of the mixed-reality environment from where the user moved their body, head or gaze since last interacting with or seeing the hologram interfaces within the mixed-reality environment. Accordingly, when a user wants to utilize an application at a first instance in a mixed-reality environment and then navigate that environment before accessing the application again, the user will typically have to go through an undesirable and inconvenient process of searching for the application hologram in the environment, which was left running, and/or they must navigate a plurality of menus to close the application and relaunch the application at the new location in a same mixed-reality domain/environment.

Perhaps, worse, if the user forgets to turn off the application when they finish interacting with the application interface, due to the application's interface hologram being out of sight due to a user navigation within the mixed-reality environment, then the system will expend undesired processing to persist the application instance/interface within the environment and to coordinate with any actual application processing occurring outside of the virtual environment.

Related problems can also occur when the user wants to continue utilizing a same application and/or world-locked holograms presented in a first mixed-reality environment/domain when the user navigates to a different mixed-reality domain/environment (e.g., an environment of a different mixed-reality program and/or a different domain of a same mixed-reality world/environment). The user must close and re-instantiate the application as a new and different hologram interface at the new and different mixed-reality environment. This may include many different menu interactions that consume undesired processing, and which can have a negative impact on the user experience.

Accordingly, there is an ongoing need in the field of mixed-reality for providing improved user interaction with holograms and for facilitating more convenient access to applications while navigating mixed-reality environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and corresponding systems and storage devices for performing the methods for selectively applying and using a carry mode for holograms presented within a mixed-reality environment.

The carry mode enables a hologram/application to be functionally moved within a single mixed-reality environment, as well as to be functionally moved out of a first mixed-reality environment and into a different mixed-reality environment without having to close the hologram/application and while leashing the application/hologram to the user.

The carry mode can be automatically applied to a hologram based on how the hologram is instantiated and/or dynamically and selectively in response to user input(s). leashing the hologram to a buffer region associated with a user's field of view can facilitate intuitive and convenient accessibility and notice of applications/holograms that are being presented and/or utilized by a user within the mixed-reality environment. Interactive elements are presented with the holograms in carry mode for enabling a user to selectively and dynamically switch the hologram out of and between the carry mode and the world-locked mode.

In some embodiments, a method is presented for controlling the carry mode of a hologram and for switching a hologram in a world-locked mode to the carry mode. For instance, the method includes displaying a first mixed-reality environment to a user that includes the presentation of a hologram in a world-locked mode relative to the mixed-reality environment. The world-locked mode causes the hologram to be at least one of either (a) fixed in a particular position within the first mixed-reality environment and/or (b) incapable of being functionally moved out of the first mixed-reality environment and into a second mixed-reality environment (e.g., it cannot be functionally moved inasmuch as the application/hologram interface will not function without instantiating the application/hologram interface in the new/second mixed-reality environment/domain if and when the user leaves and/or tries to move application/hologram out of the first mixed-reality environment/domain).

Next, carry mode user input is received within the first mixed-reality environment that causes the hologram to be switched out of the world-locked mode and to be presented to the user in a carry mode instead of the world-locked mode. The carry mode enables the hologram to be functionally moved within/throughout the first mixed-reality environment as well as to be functionally moved out of the first mixed-reality environment/domain and into a second mixed-reality environment and still function without having to close and reopen or newly instantiate the application/hologram interface from the second mixed-reality environment/domain. In other words, the same application hologram instance persists along with a functional link to the application that controls the hologram interface (even when the application is a non-native application to the mixed-reality environment(s)/domain(s).

In some instances, the disclosed embodiments include a method for automatically presenting an application/hologram interface with an interactive carry mode applied to the application/hologram within a mixed-reality environment, without requiring explicit user input for switching to the carry mode from a world-locked mode.

In these embodiments, a first mixed-reality environment is presented to a user. Then, from within the mixed-reality environment, a first application menu for launching a new/target application is presented to a user. This first application menu can be a system shell menu or another menu that is not native to the mixed-reality environment and may be presented in a world-locked mode. In some alternative instances, however, the menu can be native to the mixed-reality environment.

Then, user input is received at the first menu for launching a target application/hologram. When the target application/hologram is launched in this manner, from a particular menu of a different application/hologram interface that is invoked within or functionally presented within the mixed-reality environment (whether presented in a carry mode or world-locked mode), the new application/hologram can be automatically launched and presented in the mixed-reality environment in a carry mode, rather than being launched in a world-locked mode first.

In some instances, the first menu may also provide selectable options for enabling a user to select whether to launch the application in the world-locked mode or the carry mode. Interactive/selectable options/elements may also be presented with the new application/hologram to, when selected, switch the application/hologram from the carry mode to the world-locked mode.

In yet other embodiments, an application/hologram associated with a particular entity within a mixed-reality environment is leashed to the entity within a buffer region associated with the entity. In some instances, for example, the entity can be a user that is immersed in a mixed-reality environment and the application/hologram can be a hologram that is placed into a carry mode within the mixed-reality environment in response to user input received from the user in the mixed-reality environment. In such an embodiment, the effective application of the carry mode to the hologram can, in some instances include and/or trigger the leashing described herein.

The buffer region is, in some instances, constrained to the field of view (FOV) of the user within the mixed-reality environment. In this regard, when movement of the user is detected, relative to the hologram, in the mixed-reality environment, such as when the user's FOV has changed or is changing in the mixed-reality environment, the hologram is correspondingly rendered as moving relative to the user in the mixed-reality environment within the buffer region, at least until it is caused to move against and/or partially beyond the boundary edge of the buffer region (in response to the user movement and changing FOV). Once the hologram contacts the boundary edge(s) of the buffer region and/or at least partially moves beyond the boundary edge(s) as it moves relative to the user's changing FOV, the hologram becomes x-leashed, y-leashed and/or z-leashed against the edge of the boundary edge(s) so that the Hologram remains at least partially within the buffer region even when continued movement of the user/FOV would have otherwise caused the hologram to be moved out of the buffer region and FOV.

In other, alternative embodiments, the hologram placed within a carry mode and/or that is leashed to a buffer region is not necessarily always going to be constrained for viewing within the buffer region. For instance, in some instances, angularly leashing is used relative to the gaze direction, such that the hologram may leave the user's FOV for a period of time, based on the user's gaze, even though the hologram is persistently fixed in a particular region or location relative to the user's body (e.g., always in a lower left corner of their relative front facing proximity).

Also, the angular leashing can be constrained to as single axis (such as the gravity axis), in which case it will leave the user's FOV as the user looks up/down.

Yet additionally, in other embodiments, the holograms can be placed in a closed carry space (e.g., a closed folder or virtual briefcase that keeps the hologram out of the user's FOV, but within a predetermined location at all times the user navigates a particular environment/domain and/or traverses different environments/domains.

When a hologram is placed into a carry mode, its display properties can also be dynamically modified to reflect the carry mode. These display properties include size, color, orientation, positioning and/or any other display properties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 17 illustrates a computing environment that includes and/or that may be used to implement aspects of the disclosed methods and functionality described herein.

DETAILED DESCRIPTION

Figure 1:
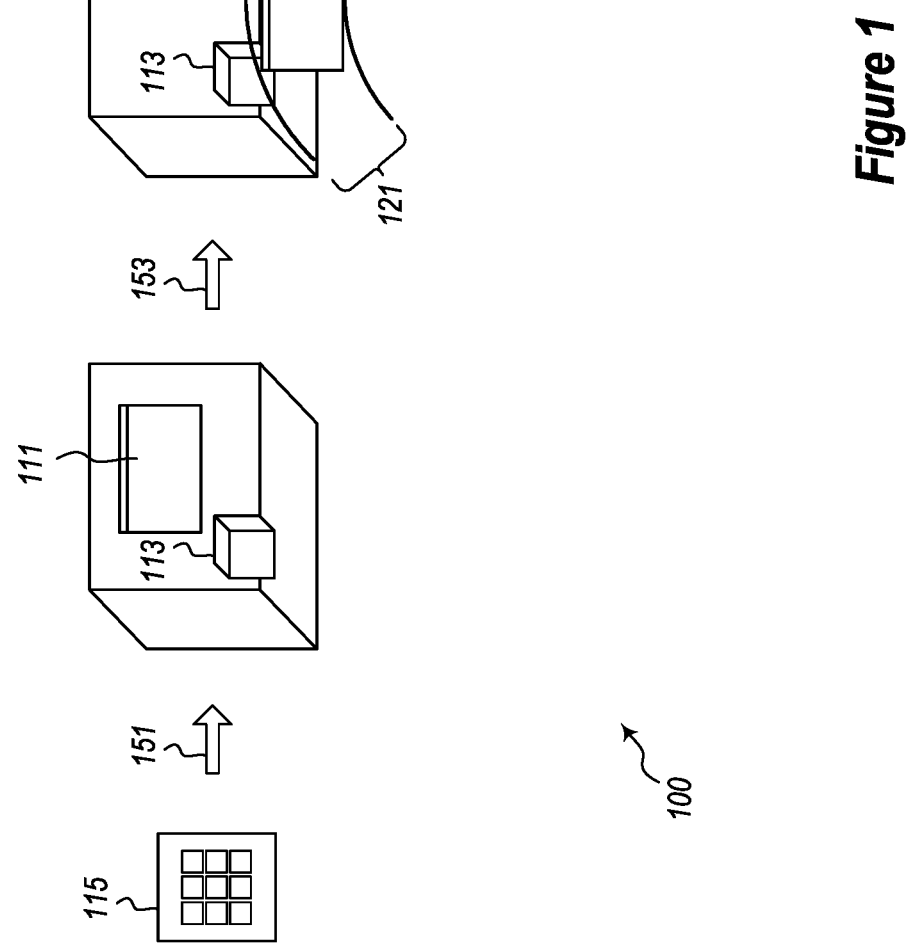
FIG. 1 illustrates an embodiment of a mixed-reality environment comprising a space defined between two sidewalls and a floor and in which holograms are presented and can be put into a carry mode.

Systems and methods are provided for selectively applying and using an interactive carry mode state for holograms presented in a mixed-reality environment and for providing leashing buffers for the holograms. The carry mode enables a hologram to be functionally moved within a single mixed-reality environment, as well as to be functionally moved out of a first mixed-reality environment and into a different mixed-reality environment. The carry mode can be automatically applied to a hologram that is created within the mixed-reality environment. The carry mode can also be applied responsive to user input applied to a world-locked hologram to trigger the switch to the carry mode from the world-locked mode. Holograms can also be leashed for persistently displaying holograms associated with or linked to a user in the mixed-reality environment to provide the user increased accessibility to the hologram while navigating within and without a particular mixed-reality environment. Selectable options are presented with a hologram in carry mode for switching from the carry mode to the world-locked mode.

As used herein, the term mixed-reality environment includes any combination of augmented reality and virtual reality environments. A mixed-reality environment may have a context that is specific to a particular application that renders one or more holograms to a user that is immersed within the mixed-reality environment. A user immersed within a particular mixed-reality environment (e.g., application context) is able to view and navigate content, such as application holograms that are native to the application, and that is presented to the user in the mixed-reality environment. In this regard, the term mixed-reality environment includes both system/shell virtual environments that are presented by corresponding system/shell applications to the user through the AR/VR device, and which may be presented to a user through one or more hologram in a mixed-reality environment, as well as any immersive content that is presented by a AR/VR specific application.

Notably, a context switch occurs between different immersive applications that are presented to a user by the mixed-reality system, each of these different contexts (when switched between and/or navigated to by a user with the mixed-reality system) may be construed as a different mixed-reality environment. Holograms presented to a user in a current context of a particular immersive environment to a user comprise, in some instances, native holograms to that current environment. In contrast, holograms from another immersive application and/or the shell may be viewed as non-native holograms relative to the current context of the particular immersive environment.

This disclosure includes embodiments which may address some or all of the aforementioned challenges associated with persistently interacting with one or more application(s)/ hologram(s) in mixed-reality environments, while also enabling user navigation within those environments.

Having just described some of the various high-level features and benefits of the disclosed embodiments, attention will now be directed to FIGS. 1 through 16. These figures illustrate various functionalities, examples, supporting illustrations, and methods related to interacting with and persistently presenting access to holograms/applications in mixed-reality environments and, in some instances, while simultaneously navigating those environments. Subsequently, attention will be directed to FIG. 17, which presents an example computer system that may be used to facilitate the disclosed principles.

FIG. 1 illustrates an embodiment of a mixed-reality environment 100 comprising a space defined between two sidewalls and a floor and in which holograms are presented and can be put into a carry mode. As shown, the holograms may include an application or interface hologram (which comprises an interface of the application) or an interactive hologram. In this regard, the term application and hologram and application interface are sometimes used interchangeably herein. In this embodiment, an App/Hologram 111 is presented with one or more other holograms 113 in the environment and is presented in response to being launched from a menu interface 115 that is accessed, for instance, outside of the actual immersed mixed-reality environment 100. The App/Hologram 111 is launched within a world-locked mode (denoted by arrow 151). Thereafter, the App/Hologram 111 is put into a carry mode (switched out of the world-locked mode, denoted by arrow 153) in response to user input. Any mapped interactive user input can be used to trigger the carry mode switch, such as a selection of an icon or menu element and/or a user gesture associated with the carry mode (e.g., a pinch for an extended period of time or any other gesture).

Once in the carry mode, an application/hologram 111 can be functionally moved within and throughout the mixed-reality environment 100 and to other mixed-reality environments/domains without having to be closed and relaunched to invoke the same functionality associated with the application/hologram 111. The properties/states of the hologram for the application are tracked with the application/hologram 111 in carry mode and those properties/states are stored and persisted for application to the application/hologram 111 when the application/hologram 111 is 'carried' throughout the mixed-reality environment 100 and to other environments.

When in the carry mode, the application/hologram 111 can be moved relative to one or more other holograms 113 in a world-locked mode, as shown and relative to the environment, while being maintained in a leashing buffer region 121 that will be described in more detail below.

Once the application/hologram 111 is taken out of the carry mode, in response to user input (any type of gesture or interactive input selecting a corresponding input element that triggers this functionality), the application/hologram 111 is either closed and taken out of the environment entirely (as denoted by arrow 155) and/or a hologram interface of the application is dropped in a world-locked mode at a current location and/or at a default and/or previous location (as denoted by arrow 157).

Figure 2:
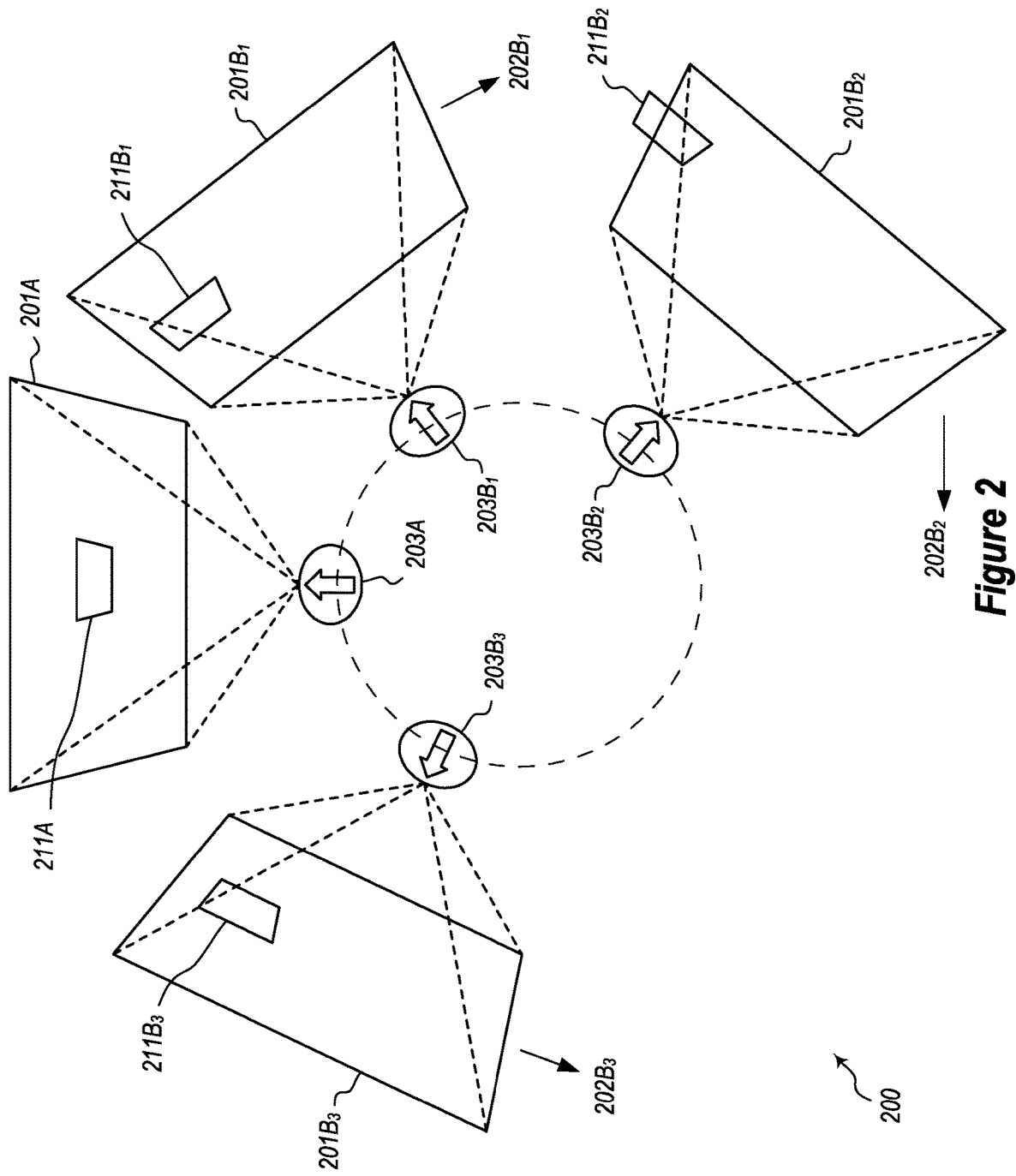
FIG. 2 illustrates an embodiment of a mixed-reality environment in which a user has a field of view (FOV) that renders a hologram and the FOV changes in response to user movements in the mixed-reality environment and in which the hologram correspondingly moves relative to the moving FOV according to a leashing buffer criteria, and while keeping the leashed hologram constrained within the FOV.

FIG. 2 illustrates an embodiment of a mixed-reality environment 200 in which a user has a field of view (FOV) that renders a hologram and the FOV changes in response to user movements in the mixed-reality environment and in which the hologram correspondingly moves relative to the moving FOV according to a leashing buffer criteria (e.g., which defines buffer region boundary dimensions and display attributes, whether a hologram that is in carry mode can traverse part or none of the buffer edge boundaries and what happens when a hologram in carry mode approaches or intersects the buffer region boundary), and while keeping the leashed hologram constrained within the FOV.

In this embodiment, a user is moving their direction within a mixed-reality environment 200 such that their FOV changes relative to an App/Hologram in the environment. Here, the hologram has position A (denoted by App/Hologram 211A, within FOV 201A) when the user is at position A (denoted by user 203A). When the user navigates to position B1 (denoted by user 203B1), the hologram is at position B1 (denoted by App/Hologram 211B1), having moved relative to the movement of the user and user's FOV 201B1 (shown with velocity 202B1). And when the user navigates to position B3 (denoted by user 203B3), the hologram is at position B3 (denoted by App/Hologram 211B3), having moved relative to the movement of the user and user's FOV 201B3 (shown with velocity 202B3). In this embodiment when the user navigates past position B1 to B2 (denoted by user 203B2), the hologram would potentially move beyond the FOV boundary (e.g., the boundary of FOV 201B2 moving with velocity 202B2). However, the leashing constraints cause the App/Hologram 211 to remain within (at least partially and, sometimes, entirely) buffer region (which in this case is the same size as the FOV 201B2). The buffer region is defined by buffer boundaries (e.g., edges of the buffer region). It will be noted that the buffer region can be larger or smaller than the FOV.

In some instances, the rules/constraints of the buffer region cause the hologram to be resized, repositioned, or moved into a fixed relative positional state of the corresponding buffer region when the hologram is positioned at or approaches the edge of the FOV (wherein the buffer boundary may be more narrow or wider than the buffer region boundaries) for a predetermined time and/or when the user's attention (gaze) is directed away from the hologram for a period of time. In some instances, the hologram can be positioned in a carry caddy/space that contains one or more resized and/or full-sized carry mode holograms that have been launched, but which are not being actively used by the user (e.g., FIG. 4).

The user can then navigate the mixed-reality environment and continuously have ready access to the holograms/applications by simply redirecting user input to the carried application, such as by performing gestures or interfacing with the hologram/application in carry mode. In some instances, this occurs by determining a user's intent based on a determining the user's focus (e.g., a gaze, a gesture or other input is directed at triggering interaction with the hologram/application in question from the carry caddy/ space), and without having to relaunch the application. Different rules can be applied for determining context of the user input based on a corresponding context of an immersive application in which the user is interacting (e.g., the current mixed-reality environment). For instance, if the user is providing input that is contextually appropriate for the immersive application context at the time the input is received, the input may be processed by the immersive application without triggering functionality of the application in carry mode. In other embodiments, when the user input is not contextually relevant or appropriate for a particular immersive application, the system may determine whether the input is appropriate for and/or contextually relevant to one or more applications in the carry mode. If so, the input is redirected to the carry application for triggering a function by the application in carry mode. In some instances, the input triggers a modification of the display of the carry mode application so that it is presented in a new/enlarged format for facilitating user interaction. In yet other embodiments, the input triggers placing the carry mode application into a world-locked mode within the immersive application.

In yet other instances, the user input triggers a function by the application in carry mode without modifying the display of the carry mode application or placing the application in a world-locked mode (i.e., the application remains in carry). In some embodiments, this occurs when a triggerable function of an application has a passive effect on the user's mixed-reality experience (e.g., the way the user perceives the mixed-reality environment in which they are currently immersed). By way of example, a user may have in carry an application/hologram for selectively changing their visualization mode to a night-vision mode, a thermographic vision mode, or other color-filtered/altered visual mode. In some implementations, the user input can selectively change their visualization mode by providing appropriate user input (e.g., a predefined gesture, gaze location, or voice command), even where that user input does not modify the display or carry state of the carry application for initiating the change in visualization mode.

In some embodiments, when a hologram is in the caddy/state, an interactive state of the hologram is changed from an active state (e.g., where a set of one or more associated functions of the hologram are executable in response to interactive user input) to an inactive state (e.g., where a set of one or more associated functions of the hologram become unresponsive to interactive user input). However, in some embodiments, the hologram is still able to be functionally moved within the first mixed-reality environment and into the second mixed-reality environment.

While in the caddy/space, the hologram/application state can be maintained for persistent recovery of the functionality of the application in any location within the environment and in other environments. The caddy/space definitions, declarations and properties/states (including those of the resident holograms, such as size and display properties and modifications to the display properties) are stored by the system to be accessible from any location with the same environment/domain or a different environment/domain. This represents one significant and technical benefit over known systems.

Figure 3A:
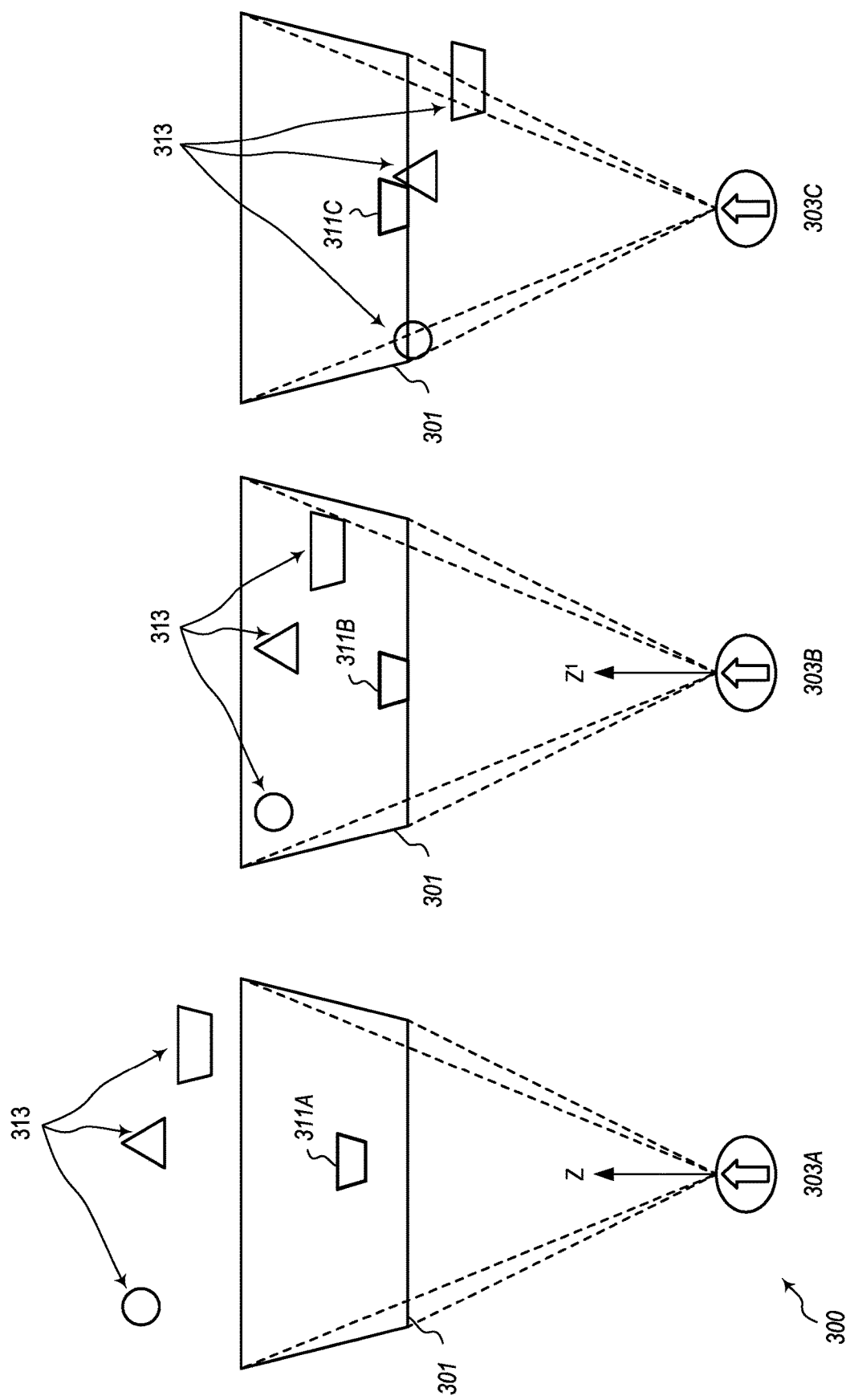
FIGS. 3A-3B illustrate embodiments of a mixed-reality environment with holograms in which a user moves within the environment and in which a hologram in carry mode is distance leashed to the user within the environment.

FIG. 3A illustrates another embodiment of a mixed-reality environment 300 in which a user has a field of view (FOV) that renders one or more holograms 313, including a particular leashed hologram (e.g., at position 311A) having a particular position relative the user (e.g., a user at perspective 303A) and wherein the FOV 301 changes in response to user movements (e.g., movement z from perspective 303A to perspective 303B) towards the leashed hologram (e.g., at position 311A), thereby creating a corresponding movement of the leashed hologram (e.g., at position 311A) in the environment 300, relative to the user's movements and the other holograms 313 in the environment 300, to positions 311B (after the user's movement z from perspective 303A to perspective 303B) and 311C (after movement z1 from perspective 303B to perspective 303C). For instance, these movements (movements z and z1) cause the leashed hologram to appear to move towards (and even past) other apps/holograms 313 in the environment 300 as the user moves in that direction.

In some instances, the movement of the user from perspective 303A to perspective 303B causes the leashed hologram (e.g., at position 311B) to hit an inner boundary of a z-axis buffer region, also referred to herein as a distance boundary, (not illustrated, but which comprises a minimum distance to the user) and causes the leashed hologram to remain locked in a relative position to the user as the user continues to move in the same direction (e.g., toward perspective 303C), so that the user does not collide with or pass the hologram in the leashed state (e.g., the leashed holograms remains at positions 311B and 311C with respect to the user, even as the user continues to move toward the leashed hologram).

In some instances, the leashed hologram is constrained within the FOV 301 of the user at a particular fixed distance from the user, once leashed, or alternatively, within a set range of buffer distances (e.g., within 2 ft to 6 ft of the user). Although not shown, this flexible range can cause the leashed hologram to flexibly and freely move within the range, relative to the user's movements (as described in FIG. 2) until the hologram intersects and/or approaches the extremities of the FOV and/or buffer range thresholds/boundaries (e.g., once the user gets to 2 ft or beyond 6 feet from the hologram).

Figure 3B:
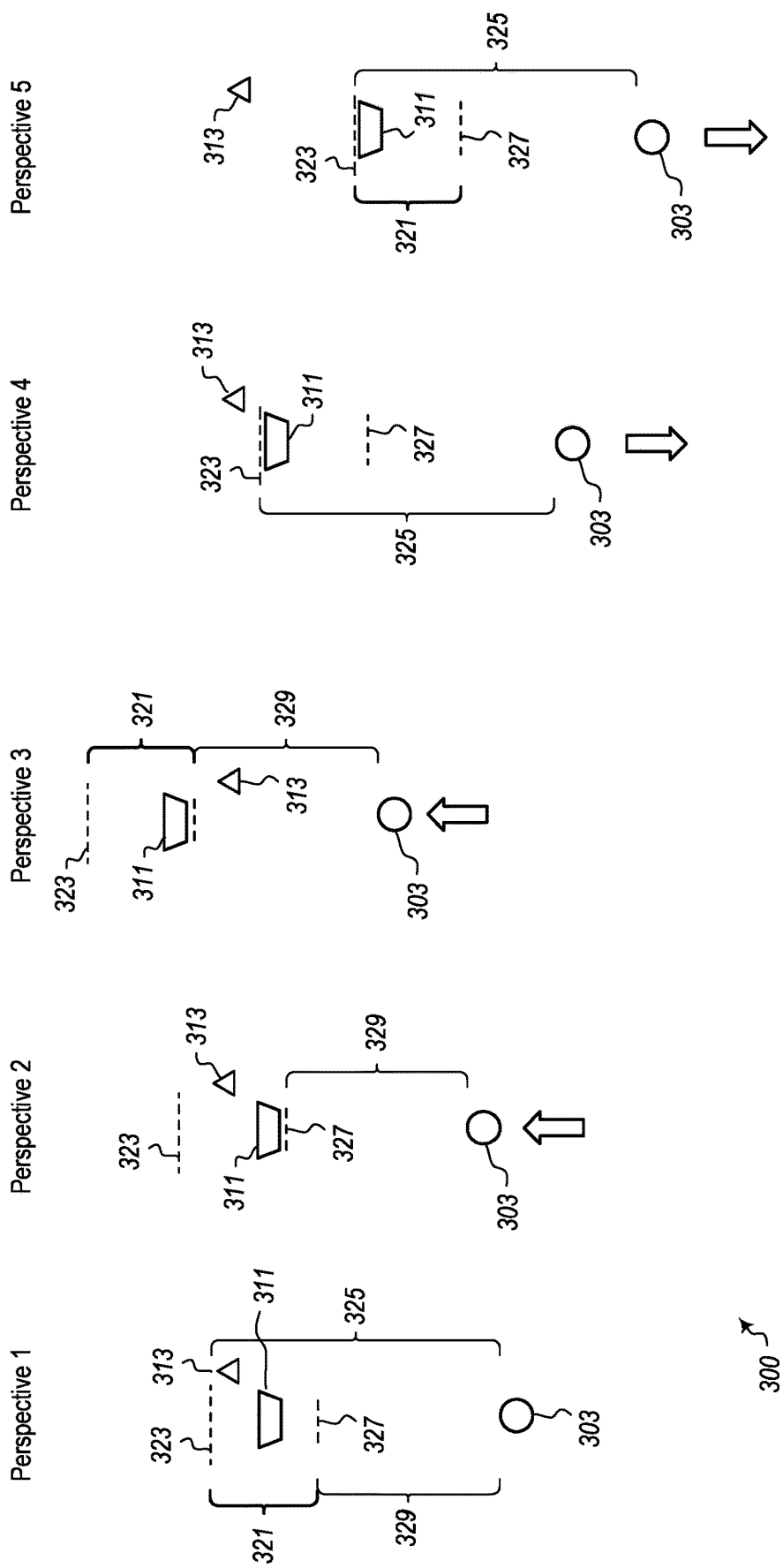

The foregoing is illustrated in more detail with respect to FIG. 3B. In this illustration, the user 303 is moved in an environment 300 that includes a hologram 313 in world-locked mode and a hologram 311 in carry mode.

In this embodiment, the distance buffer range 321 for the hologram 311 in the carry mode is defined by a maximum distance buffer boundary 323 that is a predetermined maximum distance 325 to be maintained between the hologram 311 and the user 303 and a minimum distance buffer boundary 327 that is a predetermined minimum distance 329 to be maintained between the hologram 311 from the user 303, as defined by the distance leashing parameters of the system for the hologram 311 in carry mode.

In some instances, all holograms in carry mode have the same distance leashing parameters. In other embodiments, different holograms/apps in carry mode have different distance leashing parameters. By way of example, some apps/holograms display text/messages to the user (e.g., a messenger application), and therefore the distance leashing parameters may be defined so that the app/hologram stays within region relative to the user in which the text/messages remain readable/perceivable to the user.

As shown, when the user 303 moves towards the holograms 311 and 313 (from perspective 1 to perspective 2), the distance buffer 321 moves with the user 303, including the corresponding minimum buffer boundary 323 and maximum buffer boundary 327. During this movement, the holograms 311 and 313 are both moved freely relative to the user 303 within the environment 300. In other words, as the user 303 moves towards the holograms 311 and 313, the distances between the user 303 and holograms 311 and 313 narrows and the user 303 effectively gets closer to both holograms 311 and 313.

However, as soon as the minimum distance 329 between the user 303 and the hologram 311 in carry mode is reached, as the user 303 continues to move in the same forward direction (as reflected by the movement from perspective 2 to perspective 3), then the hologram 311 will become distance locked to the user 303 at the fixed minimum distance 329 defined by the minimum distance buffer boundary 327 and then the hologram 311 will move with the user 303, as shown. The world-locked hologram 313 will not, however, because it is not distance leashed to the user 303.

The foregoing is also applicable when the user 303 moves the opposite direction in the environment 300, as reflected as the user 303 moves from perspective 1 to perspective 4 and then on to perspective 5. As shown, the hologram 313 in the world-locked mode does not move with the user 303, no matter how far the user 303 moves from the hologram 313. Instead, the distance between this hologram 313 and the user 303 continues to grow. In contrast, the hologram 311 in carry mode will move away from the user 303 (e.g., the distance between them grows), as the user 303 moves away from the hologram 311, until the distance between the user 303 and the carry mode hologram 311 reaches the maximum distance 325. Then, the hologram 311 will move with the user 303 at the maximum distance buffer boundary 323 as the user 303 continues to move in a direction away from the holograms 311 and 313.

The foregoing examples reflect how the flexibility of the leashing buffer can be applied in any direction that the user may move, to provide x-axis, y-axis and/or z-axis leashing within the mixed-reality environment.

Although not shown, the size of the hologram can enlarge when the user moves closer to the leashed hologram and can become smaller when the user moves away from the leashed hologram, while the leashed hologram remains constrained at least partially within the leash boundary region. Additionally, although not shown, the hologram can become unleashed and unconstrained by the leashing boundary region in response to user input that switches the mode of the hologram from a carry mode to a world-locked mode (e.g., in response to a gesture). Alternatively, or additionally, once the user toggles user focus (e.g., gaze) or other interactive input (e.g., gestures) to another element in the mixed-reality environment, the leashed hologram may be put into a carry caddy/space as described earlier. A user may also close the hologram/application by selecting an element that is presented with the hologram, such as a close control.

Figure 4:
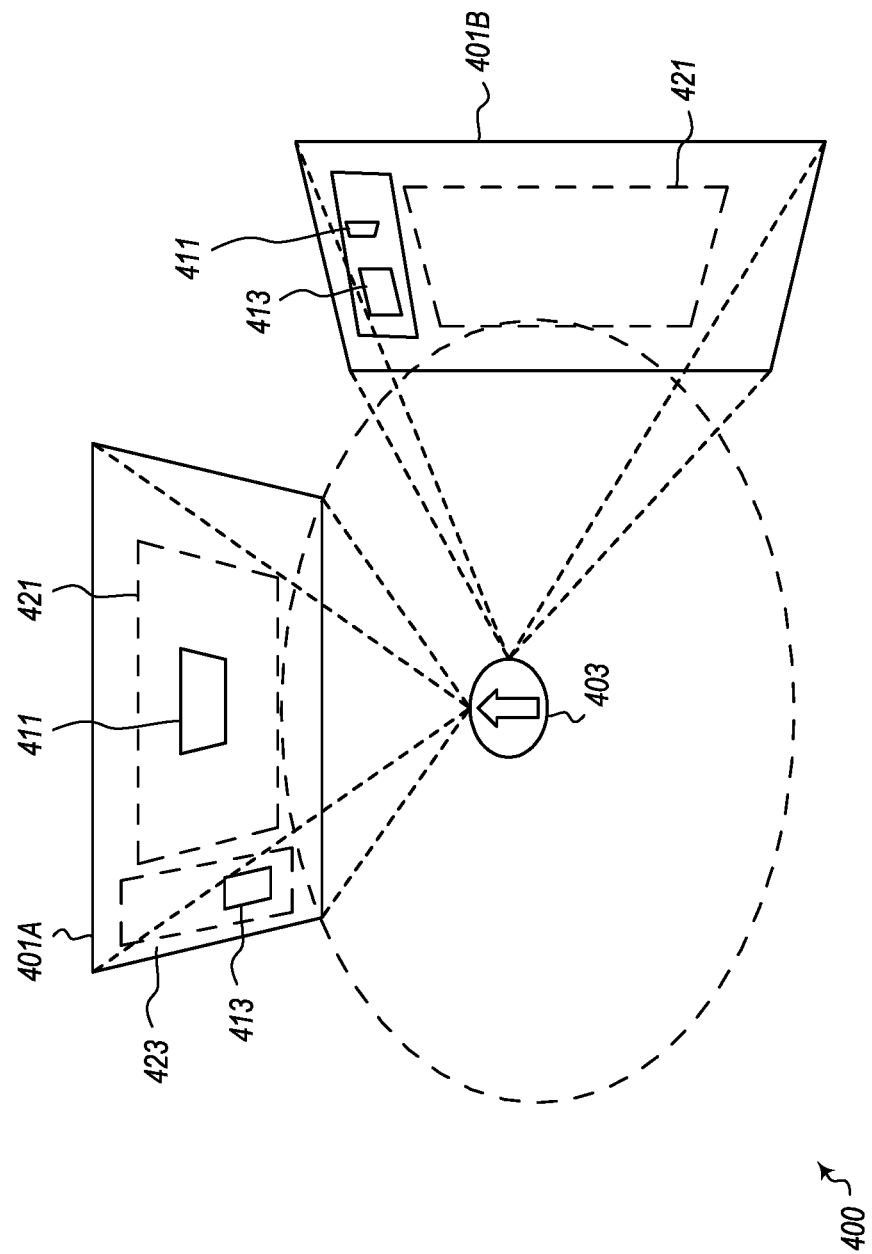
FIG. 4 illustrates another embodiment of a mixed-reality environment in which a user has a field of view (FOV) that renders a hologram and the FOV changes in response to user movements in the mixed-reality environment, in which the hologram correspondingly moves relative to the moving FOV according to a leashing buffer criteria, and which further includes a carry mode caddy/space that the hologram can be moved into.

FIG. 4 illustrates another embodiment of a mixed-reality environment 400 in which a user 403 has a field of view (FOV) that renders a hologram and the FOV changes in response to user movements in the mixed-reality environment and in which the hologram correspondingly moves relative to the moving FOV according to a leashing buffer criteria, and while keeping the leashed hologram constrained within the FOV. In this embodiment, multiple holograms (e.g., 411 and 413) can be put into a carry mode concurrently, with one or more contained in the caddy 423 and one or more applications that are put into the caddy 423 responsive to the carry mode and leashed hologram 411 intersecting a leash buffer region boundary 421 in response to movements of a user 403 in the environment and corresponding changes of the user's FOV, as described above, such as a change in the user's FOV from position 401A to 401B.

Figure 5:
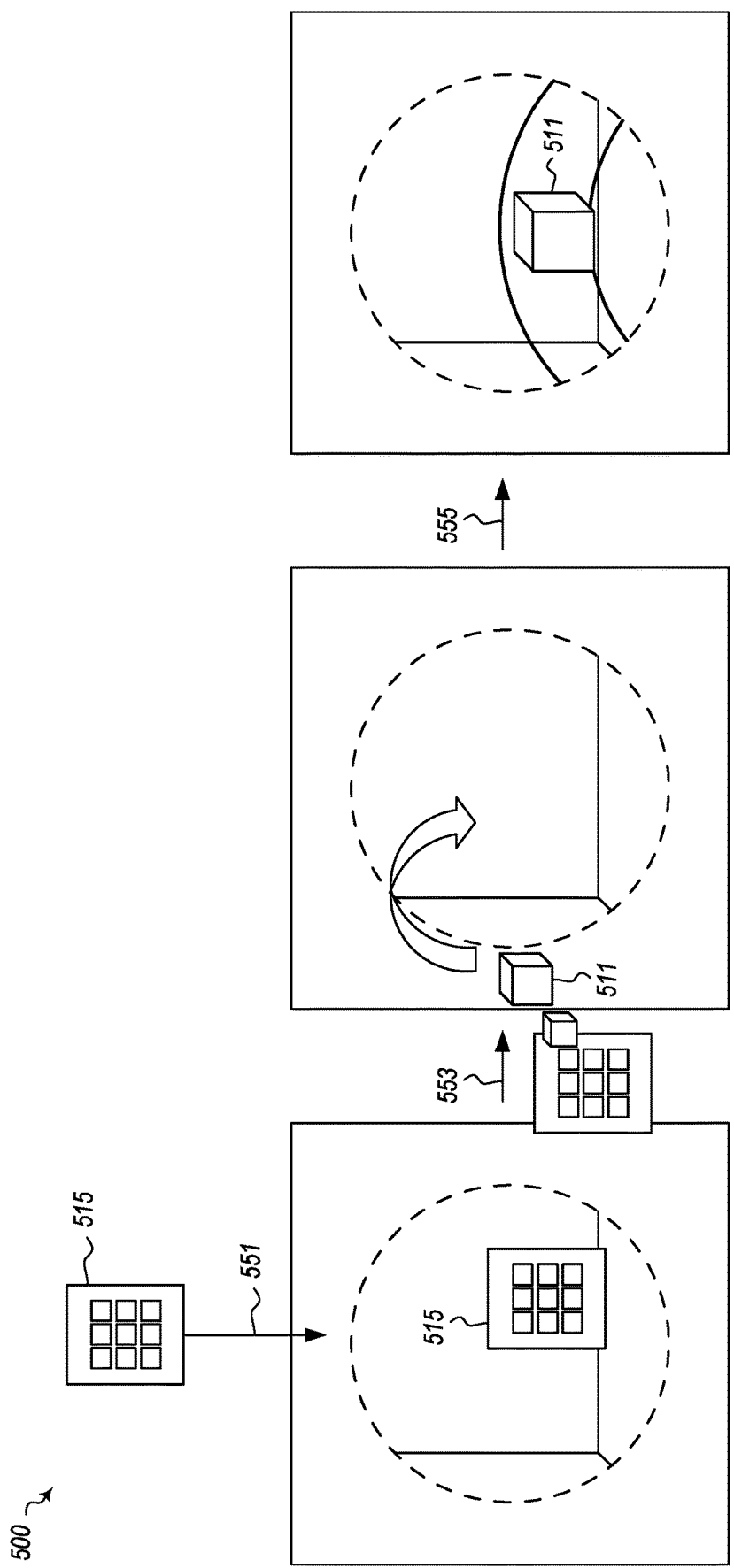
FIG. 5 illustrates an embodiment for launching/creating a hologram that is automatically crated within a carry mode.

As demonstrated in FIG. 5, the size and/or display properties and modifications to the display properties applicable to holograms in the caddy 423 are, in some embodiments, different from the size and/or display properties and modifications to the display properties applicable to holograms being displayed to the user within the leash buffer region 421 of the carry mode. This is illustrated by hologram 411 being shown with one set of size/display properties while in the leash buffer region 421 (i.e., in the user's FOV in position 401A) and with a different set of size/display properties while in the caddy 423 (i.e., in the user's FOV in position 401B).

FIG. 5 illustrates an embodiment for launching/creating a hologram that is automatically created within a carry mode. In this embodiment, a menu interface 515 is generated within a mixed-reality environment 500 (as denoted by arrow 551). A user within the mixed-reality environment 500 can then manipulate/interact with the menu to select one or more applications/holograms to create/display in the mixed-reality environment 500. The user selects application/hologram 511 for display within the mixed-reality environment 500 (as denoted by arrow 553). Subsequently, application/hologram 511 becomes created in the mixed-reality environment 500 with a carry mode applied to the application/hologram 511 (as denoted by arrow 555). This is also referenced in more detail in the methods and acts described in FIG. 15.

Those skilled in the art will recognize that the user interacting with menu interface 515 may, in some embodiments, select whether the application/hologram will become generated with a carry mode applied to it or in a world-locked state. In some implementations, the user selects whether the application/hologram will be generated/displayed in a carry mode or in a world-locked mode during the process of providing input to generate the application/hologram (e.g., two buttons exist associated with the generation of the hologram: one for generating the hologram in a world-locked state, and another for generating the hologram in a carry mode). In other instances, the user toggles a mode wherein all generated applications/holograms enter the mixed-reality environment in a carry mode.

Figure 6:
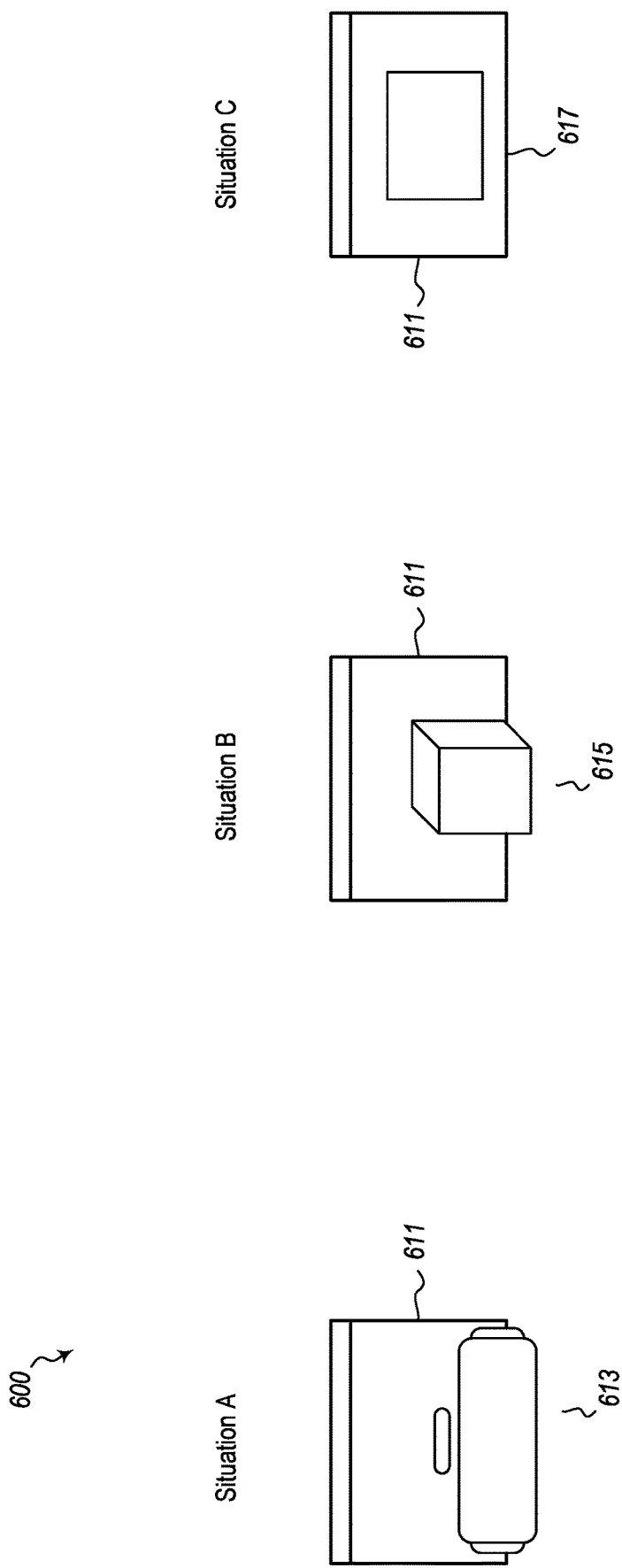
FIG. 6 illustrates embodiments for launching holograms relative to an existing hologram in a carry mode.

FIG. 6 illustrates embodiments for launching new holograms and application components in response to user input in a mixed-reality environment 600 relative to an existing/launching (or previously launched) application/hologram that may already be in a carry mode and wherein the new holograms and application components are presented relative to the corresponding launching application/holograms. For instance, FIG. 6 shows several situations in which a user has previously caused a slate 611 (such as a mixed-reality tablet or other interactable virtual device) to become tethered to the user in a carry mode. In situation A, the user launches a mixed-reality keyboard 613 in the mixed-reality environment 600 (e.g., the user launches the mixed-reality keyboard 613 to provide keyboard input to the slate 611). In this situation, if the carried slate 611 is closer than where the optimal location for the mixed-reality keyboard 613 would be with respect to the user, the slate in carry mode is moved away from the user (e.g., in the z direction) so that the mixed-reality keyboard 613 can be launched in its optimal location with respect to the user.

Similarly, in situation B, the user launches a 3D object 615 in the mixed-reality environment 600, and the carried slate 611 is moved further from the user for the 3D object 615 to launch in the carry mode (e.g., where the slate 611 previously occupied the optimal launch location for the 3D object 615). In some embodiments, the slate 611 is only moved further from the user if there is insufficient space between the minimum z distance buffer boundary of the buffer region and the slate 611 for the 3D object 615 to be launched in a carry mode therebetween.

Situation C illustrates that dialog 617 (e.g., to communicate system status such as battery power, alarms, or communications from other users or applications) is displayed between the user and the previously launched slate 611, such that the slate 611 does not impede the dialog 617. Thus, in some embodiments, objects in a carry mode will not impede dialog communications to the user.

Figure 7:
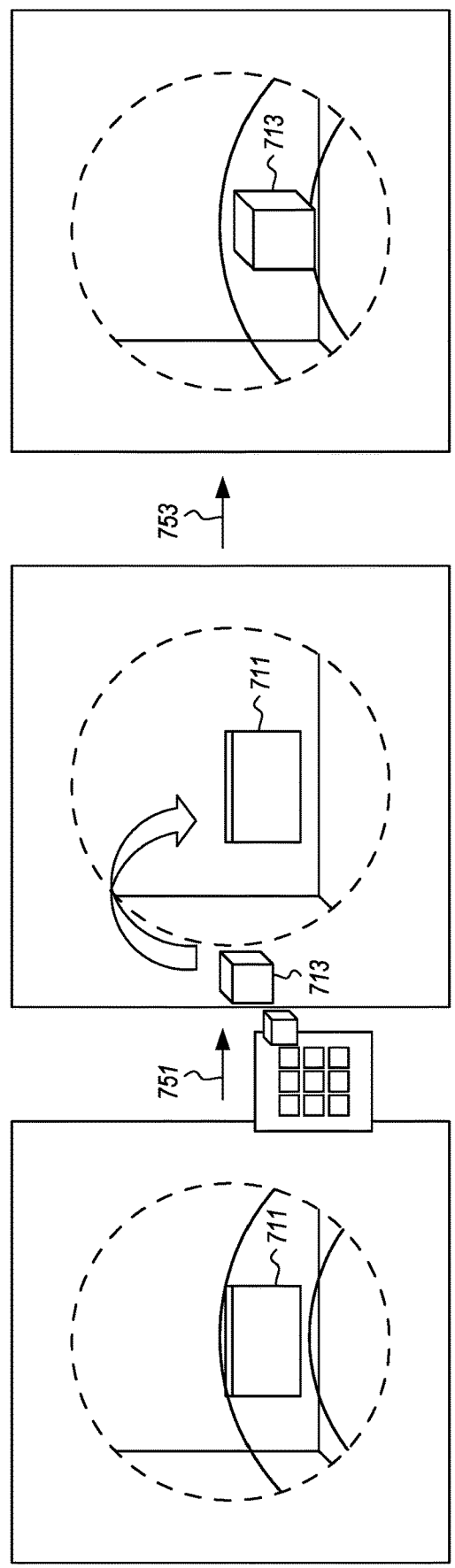
FIGS. 7, 8 and 9 illustrate embodiments for swapping holograms in carry mode and within a carry mode leashing buffer region.
Figure 8:
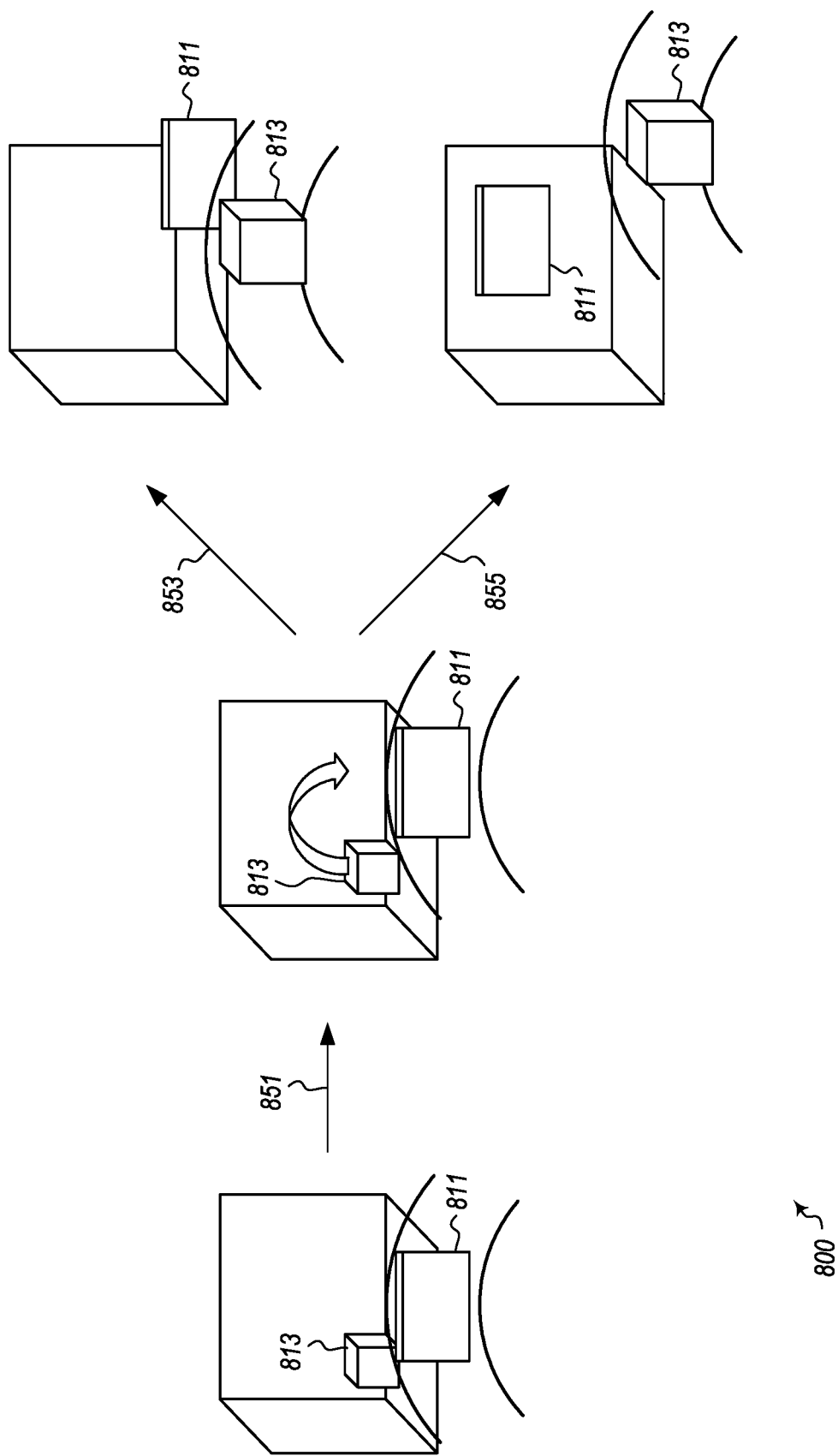
Figure 9:
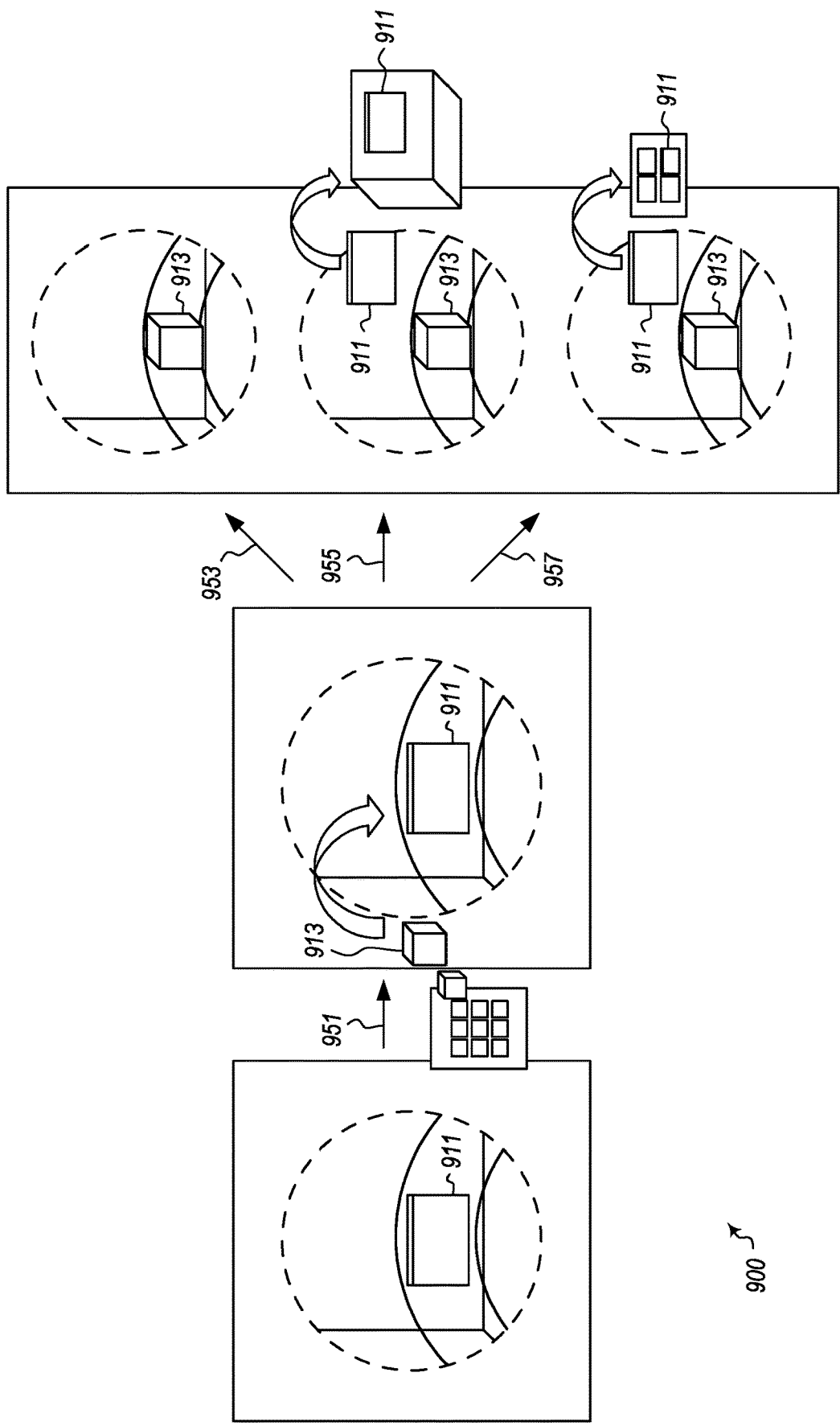

FIGS. 7, 8 and 9 illustrate some non-limiting embodiments for swapping holograms in carry mode and within the carry mode leashing buffer region associated with a particular entity (e.g., user) and wherein the carry mode leashing buffer region is associated with the particular user providing the user input for causing the swap of holograms having the carry mode in response to a triggering input for causing a new hologram to enter carry mode when another hologram is already in carry mode.

FIG. 7 shows an embodiment in which a user in mixed-reality environment 700 has previously launched a first application/hologram 711 which is currently in carry mode. Subsequently, the user launches a second application/hologram 713 (as denoted by arrow 751) and the second application/hologram 713 replaces first application/hologram 711 in carry mode (as denoted by arrow 753), such that first application/hologram 711 closes and is no longer displayed in the mixed-reality environment 700.

Similarly, FIG. 8 shows an embodiment in which a user in mixed-reality environment 800 has previously provided user input for changing a first application/hologram 811 from a world-locked state into a carry mode, such that the first application/hologram 811 is currently in carry mode. Subsequently, the user provides user input configured for changing the state of a second application/hologram 813 from a world-locked state into a carry mode (as denoted by arrow 851). In response to this user input, in some embodiments, the system returns the first application/hologram 811 to a world-locked state such that the first application/hologram 811 is no longer in the carry mode, being replaced by the second application/hologram 813. In some embodiments, after being replaced by the second application/hologram 813, the first application/hologram 811 becomes placed in the mixed-reality environment 800 at a location in the mixed-reality environment 800 near the user (as denoted by arrow 853). In other embodiments, after being replaced by the second application/hologram 813, the first application/hologram 811 becomes placed in the mixed-reality environment 800 at a location where the first application/hologram 811 was previously world-locked when the user initially brought the first application/hologram 811 into a carry mode in the mixed-reality environment 800 (as denoted by arrow 855).

Similar to FIG. 7, FIG. 9 illustrates an embodiment in which a user in mixed-reality environment 900 has previously launched a first application/hologram 911 which is currently in carry mode. Subsequently, the user launches a second application/hologram 913 (as denoted by arrow 951). In some instances, the second application/hologram 913 replaces first application/hologram 911 in carry mode (as denoted by arrow 953) such that first application/hologram 911 closes and is no longer displayed in the mixed-reality environment 900. In other instances, the second application/hologram 913 replaces first application/hologram 911 in carry mode (as denoted by arrow 955) such that the first application/hologram 911 returns to its original world-locked position in the mixed-reality environment 900 (e.g., a position from where the user initially brought the first application/hologram 911 into a carry mode). In yet other instances, the second application/hologram 913 replaces first application/hologram 911 in carry mode (as denoted by arrow 957) such that the first application/hologram 911 becomes placed in a caddy/space, as described hereinabove.

Figure 10:
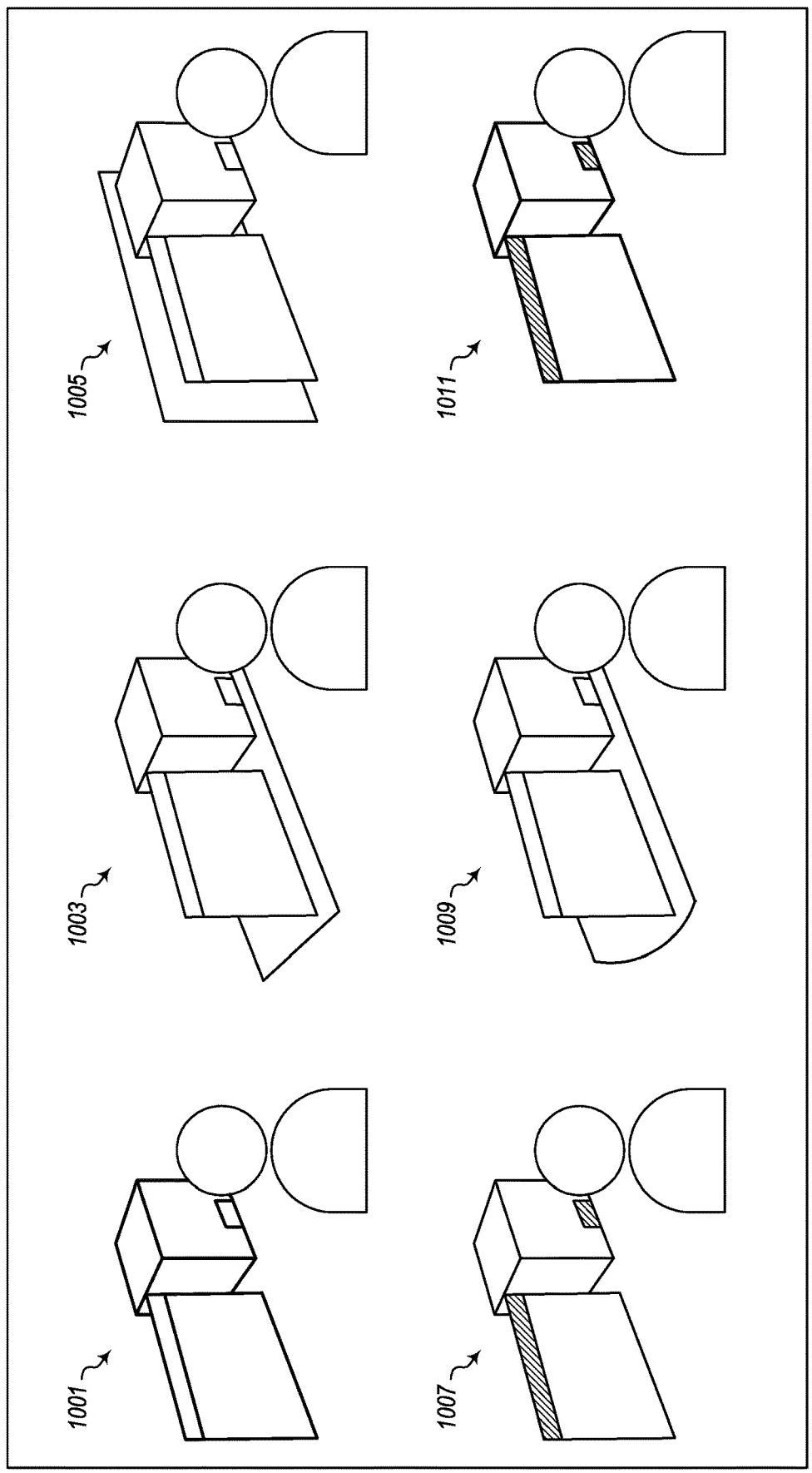
FIGS. 10, 11 and 12 illustrate embodiments for visually identifying input and carry mode of holograms in mixed-reality environments.
Figure 11:
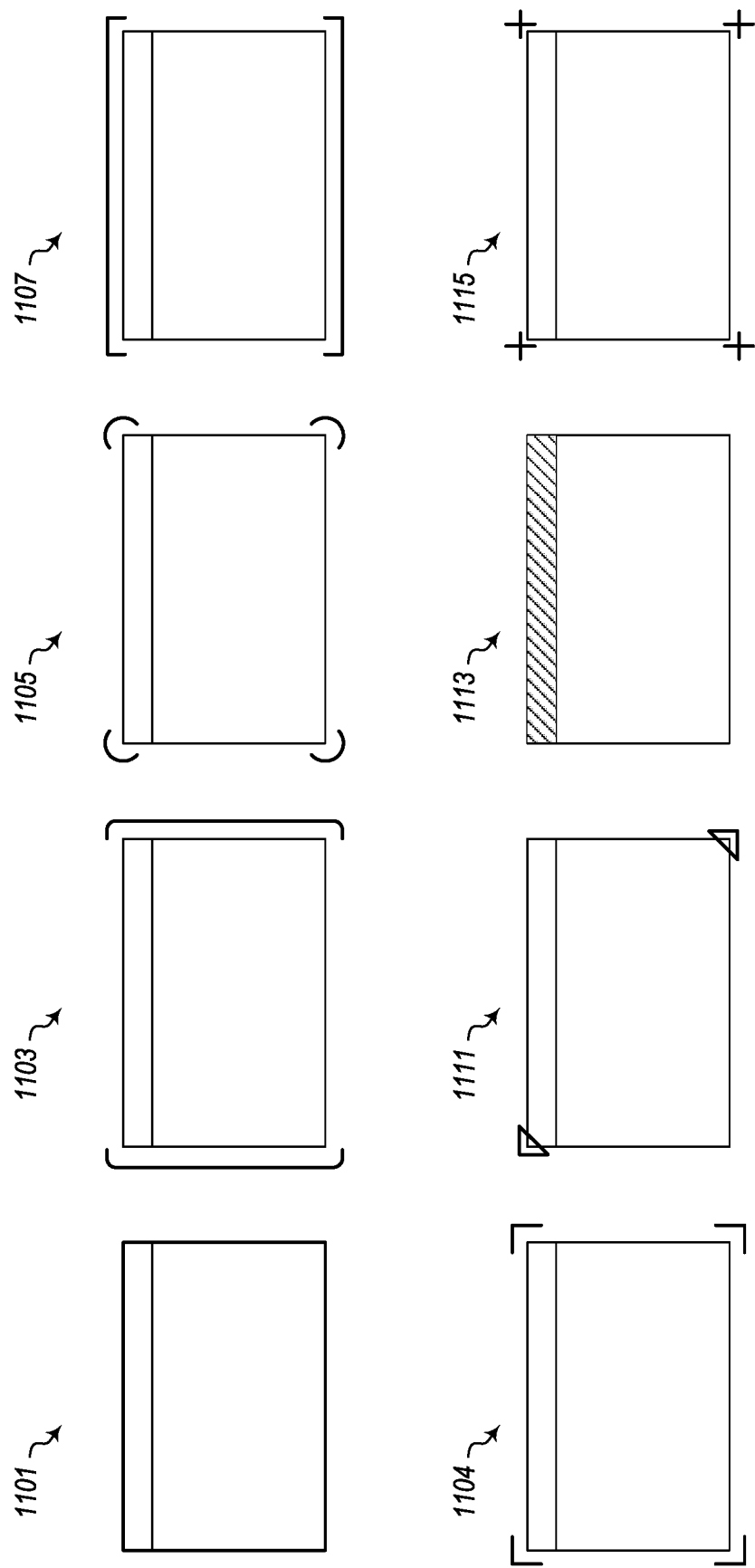
Figure 12:
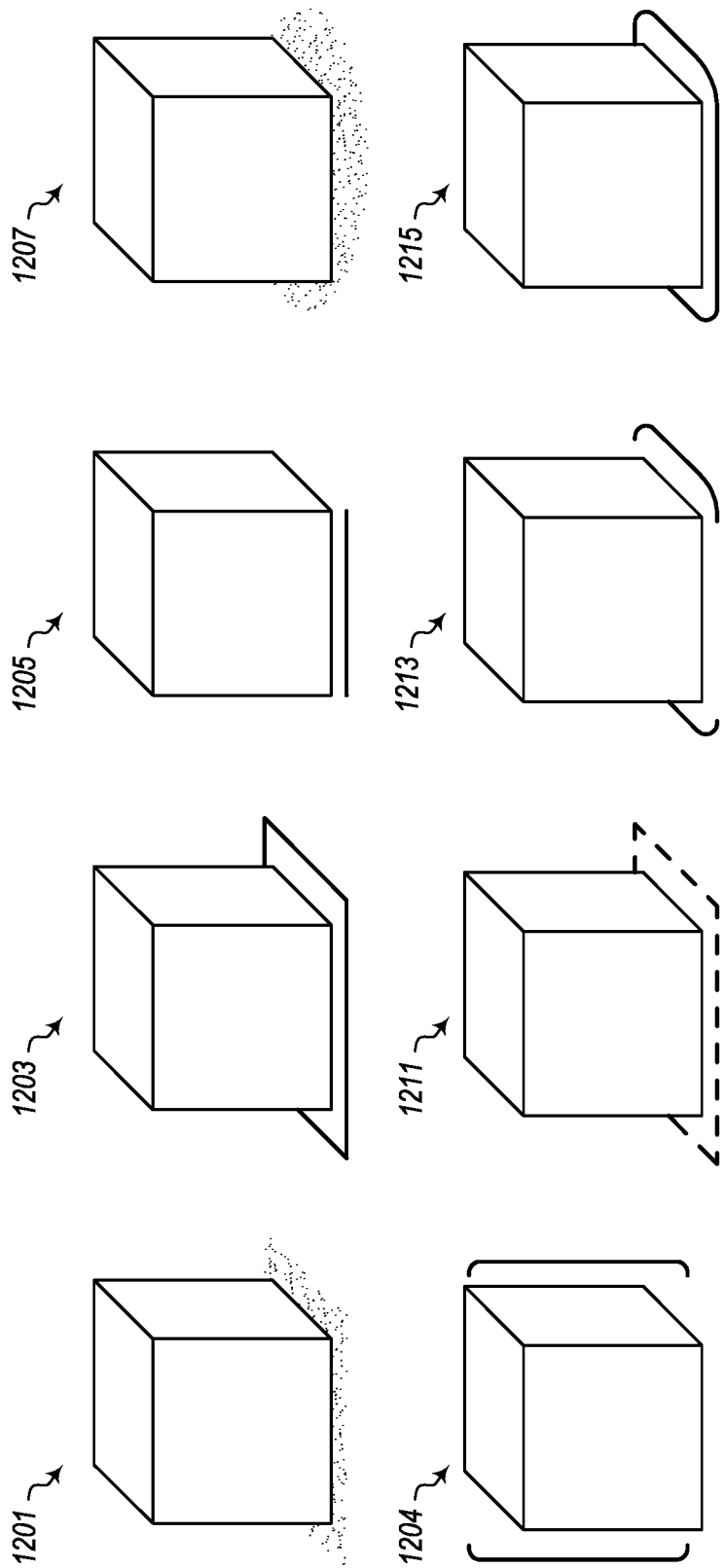

FIGS. 10, 11 and 12 illustrate embodiments for visually identifying input and carry mode of holograms in mixed-reality environments. Other configurations and visual identifiers can also be used, including icons, labels and animations. For example, turning to FIG. 10, in some instances the borders of objects/slates displayed in carry mode can be highlighted, as in implementations 1001 and 1011. In other instances, the objects/slates in carry mode are displayed with additional visual elements surrounding the objects/slates to indicate that the objects/slates are in a carry mode, such as the curved and flat accent surfaces of implementations 1003, 1005, and 1009. In yet other instances, the objects/slates in carry mode are displayed with other parts of the objects/slates highlighted, aside from or in addition to the borders of the objects/slates, to indicate that the objects/slates are in carry mode, as in implementations 1007 and 1011.

FIG. 11 illustrates various visualizations for indicating that a slate is in carry mode. For example, a slate can have a highlighted border, as in implementation 1101, or various accent borders/marks surrounding or overlapping the true borders of the slate, as in implementations 1103, 1105, 1107, 1109, 1111, and 1115. Additionally, or alternatively, a slate could have certain elements of the slate highlighted, in addition to or aside from the borders, as in implementation 1113.

FIG. 12 shows various visualizations for indicating that a 3D object is in carry mode. For example, a 3D object can have a various accent borders, marks, or shadows surrounding or overlapping the 3D object, as in implementations 1201, 1203, 1205, 1207, 1209, 1211, 1213, and 1215.

Although not explicitly described, the carry mode can also have display attributes/constraints that define the relative position, size, orientation and other display attributes within the user's FOV and the corresponding leashing buffer region and/or carry caddy/space. When a user modifies these attributes, after putting a hologram in the carry mode, those modifications can be stored and persisted when the same hologram is put into the carry mode a subsequent time. These modifications can also be stored and applied globally to one or more particular class of holograms (e.g., one or more particular type of hologram/application) and/or all holograms that are moved into the carry mode.

Figure 13:
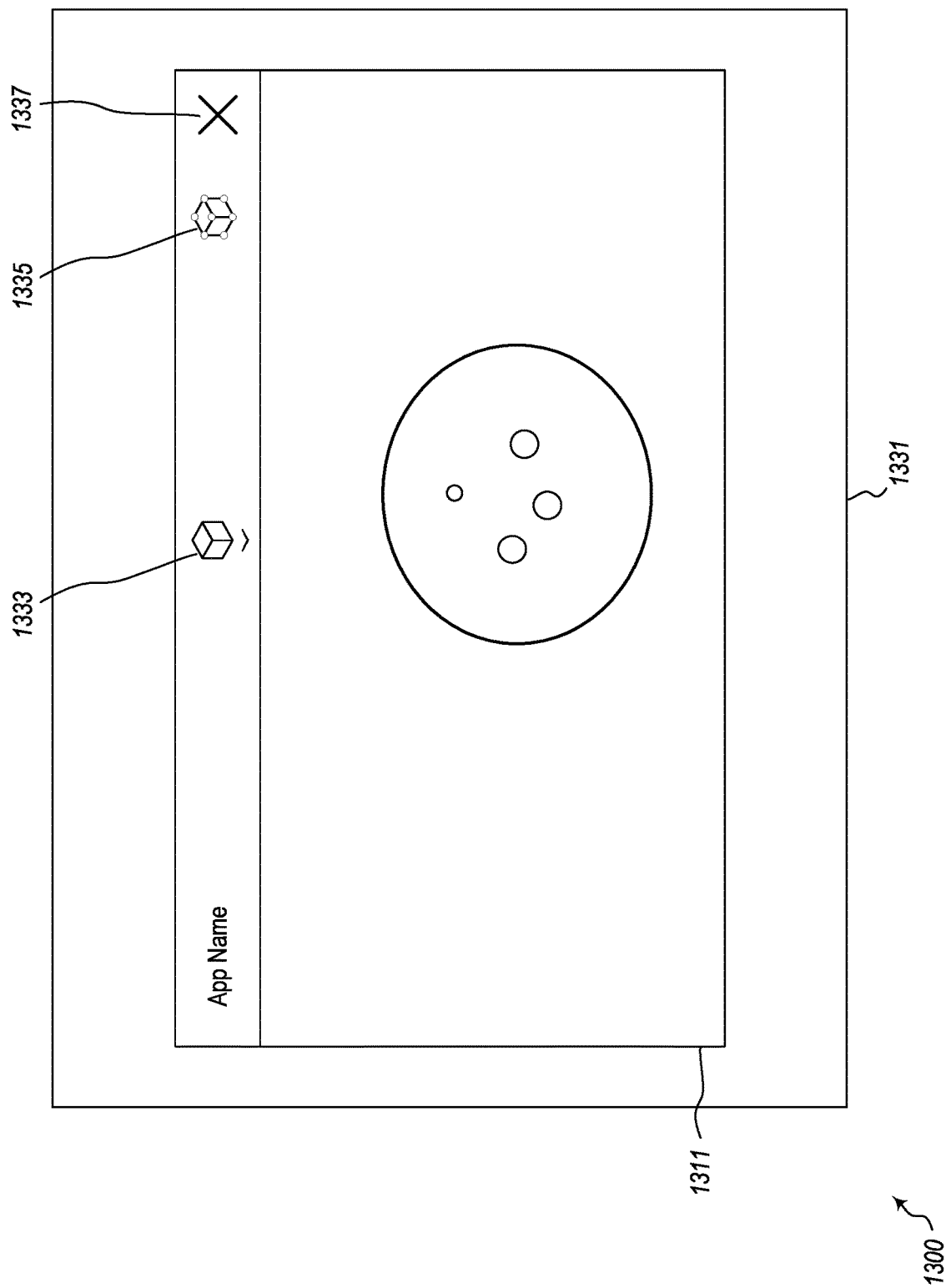
FIG. 13 illustrates a hologram having interactive elements that are selectable for triggering operation of moving the hologram out of a carry state, for manipulating a shape, size or configuration of the hologram, for reflecting a state of the hologram, and for closing out of the hologram.

FIG. 13 illustrates an application/hologram 1311 in a mixed-reality environment 1300 having interactive elements (e.g., selectable objects or selectable elements) that are selectable for triggering operation of moving the hologram into and/or out of a carry state (e.g., a carry mode icon) and/or for manipulating a display attribute of the hologram (e.g., a shape, size or other particular carry mode display configuration of the hologram), such as when being put into the carry mode leashing buffer and/or the carry caddy/space (such that the relative positioning of the hologram within a particular portion of the buffer region is fixed). For example, world-lock interactive element 1333 is operable to trigger a switch in the hologram mode, in particular to switch the hologram from the carry mode to a world-locked mode in its current position (or another position, as described hereinabove). In some instances, a carry mode icon is presented with a hologram to allow a user to put the hologram in carry mode (alternatively, the user may utilize a predetermined carry mode gesture input directed at the hologram to put the hologram in carry mode, such as by grabbing the hologram and pulling it toward the user with a predetermined velocity). The display attribute interactive element 1335 allows the user to selectively manipulate (e.g., by providing display modification input) the display attributes of the application/hologram 1311 (such as shape, size, or other attributes). Additionally, the close interactive element 1337 allows the user to terminate the application/hologram 1311 such that the application/hologram 1311 is no longer displayed in the mixed-reality environment 1300, whether in a carry mode or a world-locked mode.

Such interactive elements can be presented dynamically in response to a hologram being put in a carry mode (such that the elements were not presented with the hologram in the world-locked mode). Visual elements (such as border 1331) can also be provided with a hologram for reflecting a state of the hologram (e.g., reflecting the hologram is in carry mode or, alternatively, in the world-locked mode).

Figure 14:
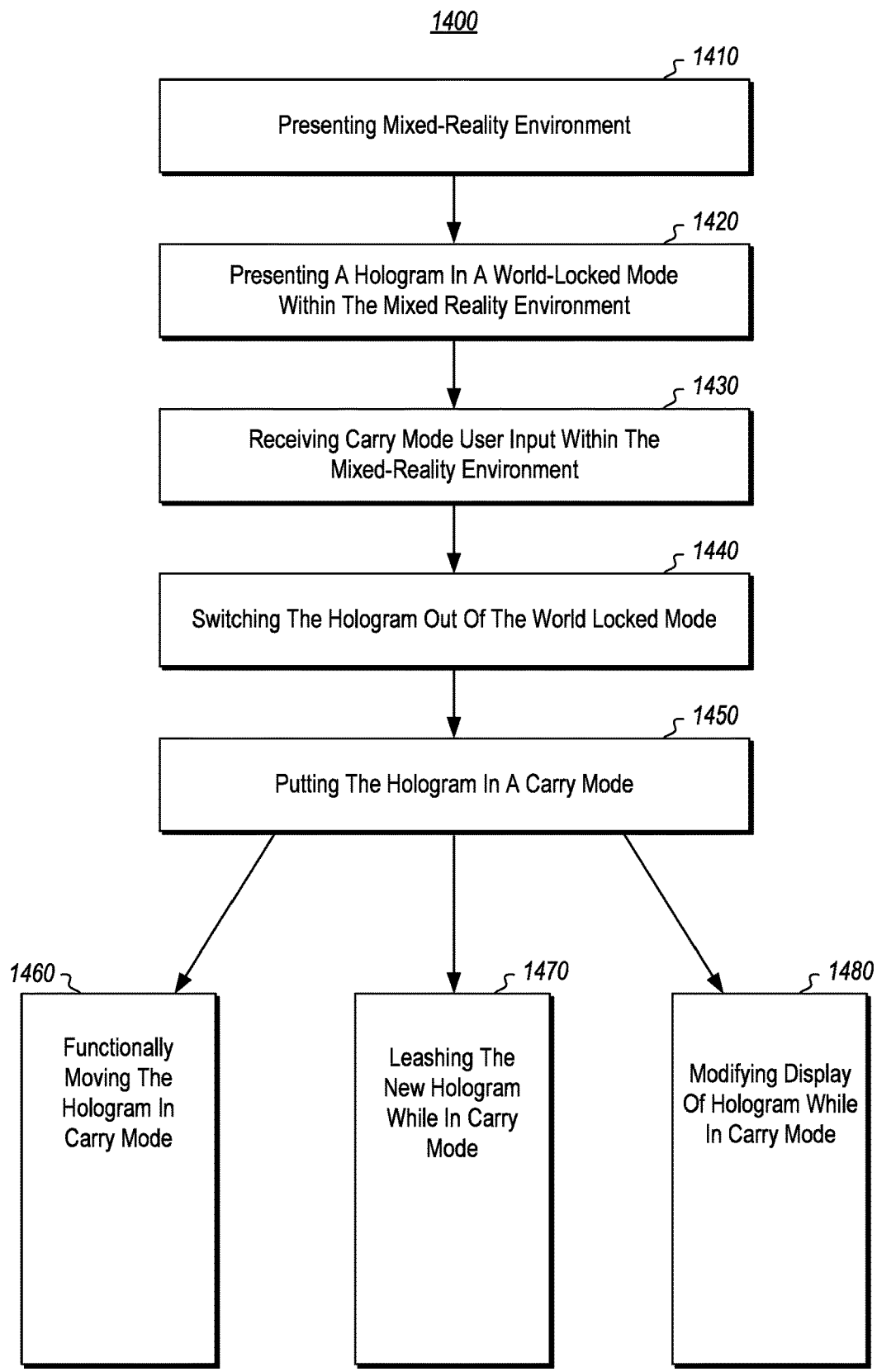
FIGS. 14-16 illustrate flowcharts of methods for controlling how a carry mode and leashing buffer region are applied to holograms in mixed-reality environments.
Figure 15:
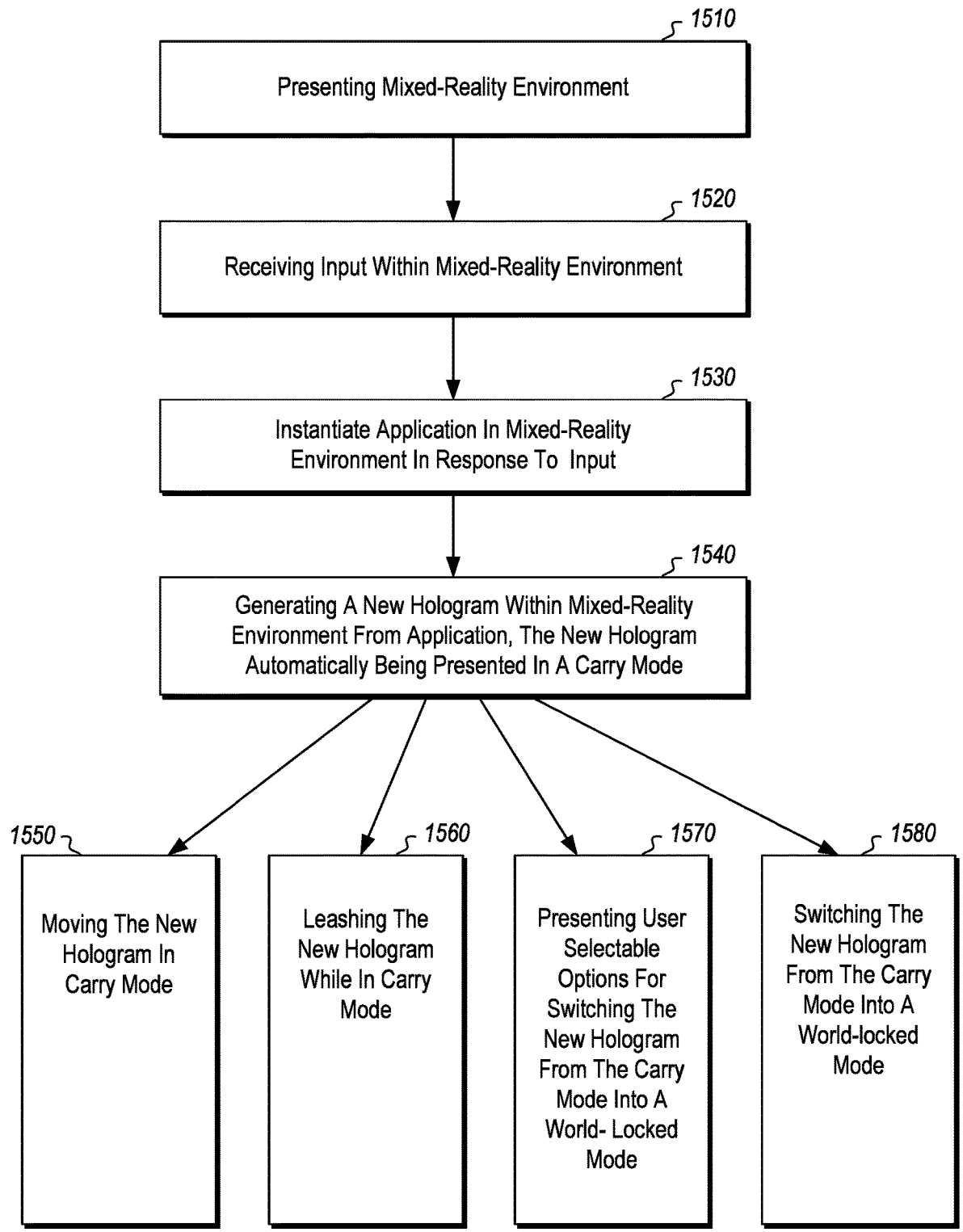
Figure 16:
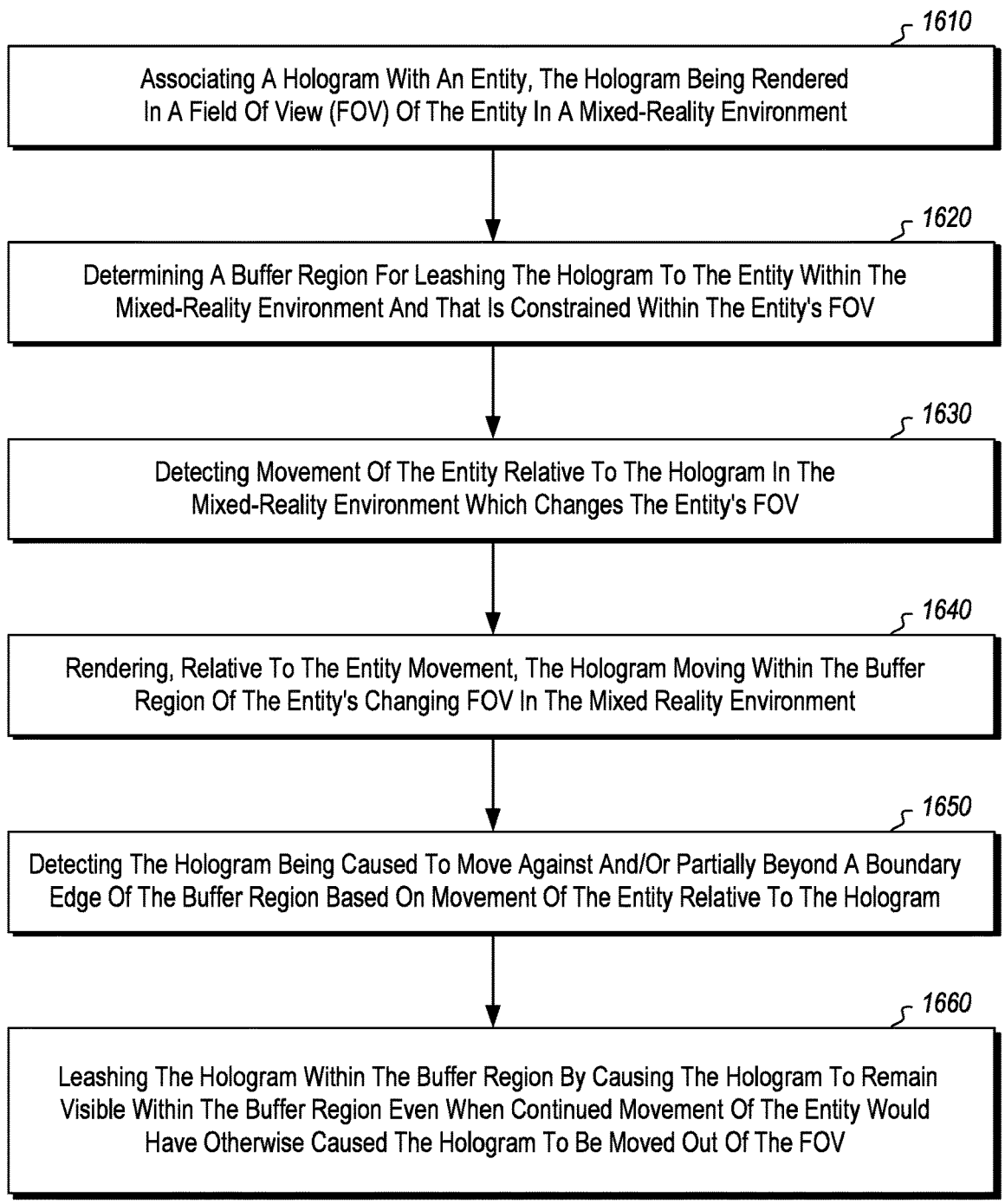

FIGS. 14 and 15 illustrate flowcharts of non-limiting embodiments of methods for controlling how a carry mode can be applied to holograms in mixed-reality environments, while FIG. 16 illustrates a flowchart of methods related to a leashing buffer region for leashing holograms to entities in mixed-reality environments.

As shown in FIG. 14, an embodiment is provided for controlling the carry mode of a hologram and for switching a hologram in a world-locked mode to the carry mode. For instance, the method includes presenting a first mixed-reality environment to a user (1410) that includes the presentation of a hologram in a world-locked mode relative to the mixed-reality environment (1420). The world-locked mode causes the hologram to be at least one of either (a) fixed in a particular position within the first mixed-reality environment and/or (b) incapable of being functionally moved out of the first mixed-reality environment and into a second mixed-reality environment (e.g., it cannot be functionally moved inasmuch as the application/hologram interface will not function without instantiating the application/hologram interface in the new/second mixed-reality environment/domain if and when the user leaves and/or tries to move application/hologram out of the first mixed-reality environment/domain). In some embodiments, the second mixed-reality environment is hosted by a different host domain than the first host domain that is used to present the first mixed-reality environment.

Next, carry mode user input is received within the first mixed-reality environment (1430). The carry mode user input causes the hologram to be switched out of the world-locked mode (1440) and to be presented to the user in a carry mode instead of the world-locked mode (1450). The carry mode enables the hologram to be functionally moved (1460). In this regard, the carry mode allows the hologram to be moved within/throughout the first mixed-reality environment as well as to be functionally moved out of the first mixed-reality environment/domain and into a second mixed-reality environment and still function without having to close and reopen or newly instantiate the application/hologram interface from the second mixed-reality environment/domain. In other words, the same application hologram instance persists along with a functional link to the application that controls the hologram interface (even when the application is a non-native application to the mixed-reality environment(s)/domain(s)).

In some embodiments, the carry mode enables the hologram to become leashed within a buffer region (1470) such that the hologram remains at least partially within a field of view of the user when the hologram is in carry mode (despite movement/rotation of the user's field of view). Additionally, in some instances, display attributes of the hologram are modified while the hologram is in carry mode (1480).

In some instances, as reflected in FIG. 15, the disclosed embodiments include a method for automatically presenting an application/hologram interface with an interactive carry mode applied to the application/hologram within a mixed-reality environment, without requiring explicit user input for switching to the carry mode from a world-locked mode.

In these embodiments, a first mixed-reality environment is presented to a user (1510). Then, from within the mixed-reality environment, a first application (e.g., an application menu) is instantiated in response to user input (1520, 1530). The first application menu is, in some instances, operable for launching a new/target application. This first application menu can be a system shell menu or another menu that is not native to the mixed-reality environment and may be presented in a world-locked mode. In some alternative instances, however, the menu can be native to the mixed-reality environment.

Then, user input is received at the first menu for launching a target application/hologram. When the target application/hologram is launched in this manner, from a particular menu of a different application/hologram interface that is invoked within or functionally presented within the mixed-reality environment (whether presented in a carry mode or world-locked mode), the new application/hologram can be automatically launched and presented in the mixed-reality environment in a carry mode, rather than being launched in a world-locked mode first (1540, 1550).

Upon the new hologram being moved/presented in the carry mode, the new hologram, in some instances, becomes leashed within a buffer region boundary, as described hereinabove in reference to FIG. 14 (1560).

In some instances, the first menu may also provide selectable options for enabling a user to select whether to launch the application in the world-locked mode or the carry mode. Interactive/selectable options/elements may also be presented with the new application/hologram to, when selected, switch the application/hologram from the carry mode to the world-locked mode (1570, 1580).

FIG. 16 illustrates acts of methods associated with leashing holograms in mixed-reality environments within a user's FOV and a buffer region constrained with the user's FOV as the user navigates a mixed-reality environment. In some instances, for example, the hologram is associated with an entity (e.g., user, group of users, or other hologram) immersed in a mixed-reality environment, and the hologram is rendered in a FOV of the entity to which the hologram is associated (1610). In such embodiments, the application/hologram can be a hologram that is placed into a carry mode within the mixed-reality environment in response to user input received from the user in the mixed-reality environment. In such an embodiment, the effective application of the carry mode to the hologram can, in some instances, include and/or trigger the leashing described herein. In other embodiments the leashing buffer is applied to holograms that are not in a carry mode.

The buffer region is, in some instances, is determined for leashing the hologram to the entity within the mixed-reality environment and is constrained to the field of view (FOV) of the user within the mixed-reality environment (1620). In this regard, when movement of the user is detected, relative to the hologram, in the mixed-reality environment, such as when the user's FOV has changed or is changing in the mixed-reality environment (1630), the hologram is correspondingly rendered as moving relative to the user in the mixed-reality environment within the buffer region (1640), at least until it is caused to move against and/or partially beyond the boundary edge of the buffer region (in response to the user movement and changing FOV) (1650). Once the hologram contacts the boundary edge(s) of the buffer region and/or at least partially moves beyond the boundary edge(s) as it moves relative to the user's changing FOV, the hologram becomes x-leashed, y-leashed and/or z-leashed against the edge of the boundary edge(s) so that the Hologram remains at least partially within the buffer region even when continued movement of the user/FOV would have otherwise caused the hologram to be moved out of the buffer region and FOV (1660).

The disclosed embodiments may, in some instances, provide various advantages over conventional systems and methods for improving user interaction with holograms/applications in mixed-reality environments. Some of these advantages include providing users with functionality that ameliorates and/or eliminates problems associated with navigating within and between different mixed-reality environments while at the same time interacting with holograms/applications in the mixed-reality environment(s).

Having just described the various features and functionalities of some of the disclosed embodiments, attention is now directed to FIG. 17, which illustrates an example computer system 1700 that may be used to facilitate the operations described herein.

The computer system 1700 may take various different forms. For example, in FIG. 17, the computer system 1700 is embodied as a head-mounted display (HMD). Although the computer system 1700 may be embodied as a HMD, the computer system 1700 may also be a distributed system that includes one or more connected computing components/devices that are in communication with the HMD. Accordingly, the computer system 1700 may be embodied in any form and is not limited strictly to the depiction illustrated in FIG. 17. By way of example, the computer system 1700 may include a projector, desktop computer, a laptop, a tablet, a mobile phone, server, data center and/or any other computer system.

In its most basic configuration, the computer system 1700 includes various different components. For example, FIG. 17 shows that computer system 1700 includes at least one hardware processing unit 1705 (aka a "processor"), input/output (I/O) interfaces 1710, graphics rendering engines 1715, one or more sensors 1720, and storage 1725. More detail on the hardware processing unit 1705 will be presented momentarily.

The storage 1725 may be physical system memory, which may be volatile, non-volatile, or some combination of the two. The term "memory" may also be used herein to refer to non-volatile mass storage such as physical storage media. If the computer system 1700 is distributed, the processing, memory, and/or storage capability may be distributed as well. As used herein, the term "executable module," "executable component," or even "component" can refer to software objects, routines, or methods that may be executed on the computer system 1700. The different components, modules, engines, and services described herein may be implemented as objects or processors that execute on the computer system 1700 (e.g. as separate threads).

The disclosed embodiments may comprise or utilize a special-purpose or general-purpose computer including computer hardware, such as, for example, one or more processors (such the hardware processing unit 1705) and system memory (such as storage 1725), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The storage 1725 may also store the applications (e.g., shell applications, other applications that are native and not native to mixed reality environments, mixed-reality environment applications, hologram definitions and attributes that are used for functionally carrying holograms in a carry mode through and between different mixed-reality environments without having to close the holograms/associated applications, as well as through different locations and domains of a single mixed-reality environment, as well as buffer region definitions for leashing holograms to users and other entities in mixed-reality environments.

The computer system 1700 may also be connected (via a wired or wireless connection) to external sensors 1730 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 1700 may also be connected through one or more wired or wireless networks 1735 to remote systems(s) 1740 that are configured to perform any of the processing described with regard to computer system 1700.

During use, a user of the computer system 1700 is able to perceive information (e.g., a mixed-reality environment) through a display screen that is included among the I/O interface(s) 1710 and that is visible to the user. The I/O interface(s) 1710 and sensors 1720/1730 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, a user gaze, body position, and so forth, and/or any other object(s) that the user may interact with while being immersed in the scene. The interfaces 1710 present the mixed-reality environment to the user immersed in the mixed-reality environment, along with holograms within the user's FOV within the mixed-reality environment.

The graphics rendering engine 1715 is configured, with the hardware processing unit 1705, to render one or more virtual objects within the scene. As a result, the virtual objects accurately move in response to a movement of the user and/or in response to user input as the user interacts within the virtual scene.

A "network," like the network 1735 shown in FIG. 17, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 1700 will include one or more communication channels that are used to communicate with the network 1735. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the hardware processing unit 1705). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description.

For instance, by way of further illustration of additional functionality that can be applied to the scope of this disclosure is the functionality of selectively applying/considering a hologram during surface reconstruction being performed during rendering of the mixed-reality environment or not, by selectively ignoring the and refraining from performing surface reconstruction of holograms in a carry mode. This may be beneficial, for example, to enable the hologram to traverse apparent physical barriers while being moved/carried. In this regard, this enforces the intuitive notion that the hologram in carry mode is not world-locked and functionally immovable during navigation of the mixed-reality world (e.g., it won't break by being moved at or through another object).

All changes which come within the meaning and range of equivalency of the claims are to be embraced within their scope.

What is claimed is:

1. A system for selectively and dynamically controlling an interactive carry mode state of one or more holograms in a mixed-reality environment, the system comprising:
   one or more processors; and
   one or more computer-readable media having stored thereon computer-executable instructions that are operable, when executed by the one or more processors, to cause the system to:
   display a first mixed-reality environment to a user;
   present a hologram in a world-locked mode to the user within the first mixed-reality environment, the world-locked mode causing the hologram to be at least one of either (a) fixed in a particular position within the first mixed-reality environment and/or (b) incapable of being functionally moved out of the first mixed-reality environment into a second mixed-reality environment;
   receive carry mode user input within the first mixed-reality environment that is directed at the hologram and that causes the hologram to be switched out of the world-locked mode and to be presented to the user, instead, in a carry mode that enables the hologram to be functionally moved within the first mixed-reality environment as well as to be functionally moved out of the first mixed-reality environment and into a second mixed-reality environment; and
   render the hologram with a particular carry mode display configuration that includes leashing the hologram to at least a buffer region associated with and visible within a FOV (field of view) of the user who is viewing the first mixed-reality environment, such that at least a portion of the hologram is continuously rendered to the user within the buffer region when the user moves around within the first mixed-reality environment and after the carry mode input is no longer directed at the hologram.

2. The system of claim 1, wherein the computer-executable instructions are further operable to cause the system to:
   remove the hologram from the first mixed-reality environment and present the hologram to the user in the second mixed-reality environment in response to user input received after the hologram is presented in the carry mode; and
   receive user input for interacting with the hologram in the second mixed-reality environment and which initiates a function associated with the hologram in the second mixed-reality environment, such that the hologram is functional in the second mixed-reality environment.

3. The system of claim 2, wherein the first mixed-reality environment is instantiated by execution of a first application and the second mixed-reality environment is instantiated by execution of a second application, the first and second applications being executed within a same shell operating system.

4. The system of claim 2, wherein the second mixed-reality environment is hosted by a different host domain than a first host domain that is used to present the first mixed-reality environment.

5. The system of claim 4, wherein the hologram is native to the first mixed-reality environment, and wherein the hologram is non-native to the second mixed-reality environment.

6. The system of claim 1, wherein the carry mode user input comprises a selection of a carry mode icon that is presented with the hologram.

7. The system of claim 1, wherein the carry mode user input comprises a predetermined carry mode gesture input directed at the hologram.

8. The system of claim 1, wherein rendering the hologram with the particular carry mode display configuration includes modifying a display attribute associated with the hologram in response to switching the hologram out of the world-locked mode and presenting the hologram in the carry mode.

9. The system of claim 8, wherein the display attribute includes a size of the hologram.

10. The system of claim 1, wherein rendering the hologram with the particular carry mode display configuration includes fixing a relative positioning of the hologram within a particular portion of the buffer region.

11. The system of claim 1, wherein the computer-executable instructions are further operable to cause the system to receive display modification input that is operable to modify the particular carry mode display configuration and wherein the particular carry mode display configuration is saved for rendering the hologram and/or one or more other holograms in the carry mode, automatically, a next time the hologram and/or the one or more other holograms are switched into the carry mode from the world-locked mode.

12. The system of claim 11, wherein the computer-executable instructions are further operable to cause the system to:
receive input for modifying the interactive state of the hologram to an active state after the hologram is moved to the second mixed-reality environment or to a different location within the first mixed-reality environment; and
modify a display of the hologram to reflect the hologram is in the active state.

13. The system of claim 1, wherein the computer-executable instructions are further operable to cause the system to:
receive input for changing an interactive state of the hologram from an active state to an inactive state while in the carry mode, wherein the hologram is unable to perform a set of one or more associated functions that are executable in response to interactive user input while the hologram is in the inactive state, but while the hologram is still enabled to be functionally moved within the first mixed-reality environment and into the second mixed-reality environment;
receive input for moving the hologram while in the carry mode and inactive state; and
modify a display attribute of the hologram while in the inactive state.

14. The system of claim 13, wherein the computer-executable instructions are further operable to cause the system to:
receive the interactive user input for triggering execution of one or more associated interactive functions while the hologram is in the active state and responsively performing the one or more associated interactive functions.

15. The system of claim 1, wherein the computer-executable instructions are further operable to cause the system to:
move the hologram from a first location within the first mixed-reality environment to a second location within the first mixed-reality environment while the hologram is in the carry mode and in response to user input causing the user to navigate within the first mixed-reality environment, such that the hologram is leashed to the user in the first mixed-reality environment; and
receive user input for interacting with the hologram in the first mixed-reality environment and which initiates a function associated with the hologram in the first mixed-reality environment, such that the hologram is functional after being moved within the first mixed-reality environment.

16. The system of claim 1, wherein the hologram is an application interface with one or more selectable options which, when selected, trigger the generation of one or more new holograms with the hologram.

17. The system of claim 16, wherein the computer-executable instructions are further operable to cause the system to receive input for selecting the one or more selectable options and rendering the one or more new holograms in a field of view (FOV) of the user in a position that is relatively between the user and the hologram.

18. The system of claim 1, wherein the computer-executable instructions are further operable to cause the system to render the hologram with a selectable object that is operable, when selected, for switching the hologram from the carry mode to the world-locked mode.

19. The system of claim 1, wherein the computer-executable instructions are further operable to cause the system to:
receive user input selecting a second hologram that is in the world-locked mode; and
in response to the user input selecting the second hologram, automatically switch the hologram from the carry mode to the world-locked mode and switching the second hologram from the world-locked mode to the carry mode.

20. The system of claim 1, wherein one or more leashing parameters of the buffer region are based on one or more attributes of the hologram.

21. A system for presenting a hologram with an interactive carry mode state in a mixed-reality environment, the system comprising:
one or more processors; and
one or more computer-readable media having stored thereon computer-executable instructions which are operable, when executed by the one or more processors, to cause the system to:
display a first mixed-reality environment to a user;
receive user input within the first mixed-reality environment that instantiates an application and which also causes a hologram interface for the application to be rendered within the first mixed reality environment, the interface hologram having selectable elements which, when selected in the first mixed-reality environment, trigger functionality of the application, the application also being executable outside of the first mixed-reality environment;

receive interactive user input directed at and selecting one or more of the selectable elements;

in response to the interactive user input, display a new application hologram associated with the application, the new application hologram being presented within the first mixed-reality environment in a carry mode rather than a world-locked mode, the carry mode causing the new application hologram to be displayed with a particular carry mode display configuration that includes leashing the new application hologram to at least a buffer region associated with and visible within a FOV (field of view) of the user such that at least a portion of the new application hologram is continuously rendered to the user within the buffer region when the user moves around within the first mixed-reality environment and after the interactive user input is no longer directed at the one or more of the selectable elements, the carry mode enabling the new application hologram to be functionally moved within the first mixed-reality environment as well as to be functionally moved out of the first mixed-reality environment and into a second mixed-reality environment, wherein the world-locked mode causes that the new application hologram to be at least one of either (a) fixed in a particular position within the first mixed-reality environment and/or (b) incapable of being functionally moved out of the first mixed-reality environment into the second mixed-reality environment; and present the new application hologram with a selectable option for switching the new application hologram from the carry mode to the world-locked mode.

\* \* \* \* \*